(12) United States Patent
Voss

(10) Patent No.: US 10,457,348 B2
(45) Date of Patent: Oct. 29, 2019

(54) BICYCLE REAR SUSPENSION

(71) Applicant: USUL Corporation, Vancouver, WA (US)

(72) Inventor: Darrell W. Voss, Vancouver, WA (US)

(*) Notice: Subject to any disclaimer, the term of this patent is extended or adjusted under 35 U.S.C. 154(b) by 0 days.

(21) Appl. No.: 14/956,274

(22) Filed: Dec. 1, 2015

(65) Prior Publication Data
US 2016/0083042 A1 Mar. 24, 2016

Related U.S. Application Data

(62) Division of application No. 13/840,754, filed on Mar. 15, 2013, now Pat. No. 9,242,693.

(51) Int. Cl.
B62K 3/02 (2006.01)
B62K 25/20 (2006.01)
B62K 25/04 (2006.01)
B62K 25/28 (2006.01)
B62K 19/18 (2006.01)

(52) U.S. Cl.
CPC .............. B62K 25/20 (2013.01); B62K 19/18 (2013.01); B62K 25/04 (2013.01); B62K 25/28 (2013.01); B62K 25/286 (2013.01)

(58) Field of Classification Search
CPC ....... B62K 25/00; B62K 25/28; B62K 25/286
See application file for complete search history.

(56) References Cited

U.S. PATENT DOCUMENTS

| 5,207,619 A | 5/1993 | Klein et al. |
| 5,284,354 A | 2/1994 | McWethy |
| 5,360,088 A | 11/1994 | Voss |
| 5,364,115 A | 11/1994 | Klein et al. |
| 5,377,734 A | 1/1995 | Klein et al. |
| 5,385,361 A | 1/1995 | Bei |
| 5,405,159 A | 4/1995 | Klein et al. |
| 5,433,465 A | 7/1995 | Klein et al. |
| 5,452,911 A | 9/1995 | Klein et al. |

(Continued)

FOREIGN PATENT DOCUMENTS

| FR | 2898578 A1 | 9/2007 |
| WO | 9529838 A1 | 11/1995 |

(Continued)

OTHER PUBLICATIONS

Tony Winter, Non-Final Office Action, U.S. Appl. No. 13/840,754, Inventor: Darrell W. Voss, dated Dec. 26, 2014, United States Patent and Trademark Office, Alexandria, VA US.

(Continued)

Primary Examiner — Tony H Winner
(74) Attorney, Agent, or Firm — Young's Patent Services; Bruce A Young

(57) ABSTRACT

The vehicle includes a frame member to be suspended relative to the ground. The suspension of the invention includes an arm (such as a swingarm), a slide link, and a control link. The arm having a first end and a second end; it extends between the frame generally at the first end and the ground-engaging member generally at the second end. The slide link is coupled between the frame and the arm. The slide link is rotationally fixed to the arm to rotationally move therewith. It is pivotally secured to the frame. The control link is also coupled to the frame and to the arm.

42 Claims, 26 Drawing Sheets

(56) References Cited

U.S. PATENT DOCUMENTS

| | | | |
|---|---|---|---|
| 5,470,091 A | 11/1995 | Voss et al. | |
| 5,499,864 A | 3/1996 | Klein et al. | |
| 5,517,878 A | 5/1996 | Klein et al. | |
| 5,553,881 A | 9/1996 | Klassen et al. | |
| 5,557,982 A | 9/1996 | Voss et al. | |
| 5,586,780 A | 12/1996 | Klein et al. | |
| 5,626,355 A | 5/1997 | Voss et al. | |
| 5,692,764 A | 12/1997 | Klein et al. | |
| 5,743,547 A | 4/1998 | Voss et al. | |
| 5,762,352 A | 6/1998 | Lee | |
| 5,772,228 A | 6/1998 | Owyang | |
| 5,791,674 A * | 8/1998 | D'Aluisio | B62K 25/286 180/227 |
| 5,826,899 A | 10/1998 | Klein et al. | |
| 5,906,385 A | 5/1999 | Voss | |
| 5,944,932 A | 8/1999 | Klein et al. | |
| 5,988,741 A | 11/1999 | Voss et al. | |
| 6,109,636 A | 8/2000 | Klein et al. | |
| 6,170,845 B1 * | 1/2001 | Tseng | B62K 25/286 280/284 |
| 6,206,396 B1 | 3/2001 | Smith | |
| 6,361,059 B1 | 3/2002 | Ellsworth | |
| 6,609,722 B1 | 8/2003 | Miyoshi et al. | |
| RE38,669 E | 12/2004 | Voss et al. | |
| 6,848,700 B1 | 2/2005 | Fritschen | |
| 7,100,930 B2 * | 9/2006 | Saiki | B62K 25/286 280/284 |
| 7,147,238 B2 | 12/2006 | Oi | |
| 7,395,892 B2 * | 7/2008 | Alonzo | B62K 25/286 180/227 |
| 7,494,146 B2 * | 2/2009 | Tseng | B62K 3/02 280/284 |
| 7,556,276 B1 * | 7/2009 | Dunlap | B62K 25/286 280/284 |
| 7,566,066 B2 * | 7/2009 | Chang | B62K 25/286 280/283 |
| 7,722,072 B2 | 5/2010 | Hoogendoorn | |
| 7,815,207 B2 | 10/2010 | Currie | |
| 8,272,658 B2 | 9/2012 | Hoogendoorn | |
| 8,382,136 B2 * | 2/2013 | Beale | B62K 19/18 280/275 |
| 8,622,411 B1 * | 1/2014 | Chamberlain | B62K 25/286 280/281.1 |
| 9,039,026 B2 * | 5/2015 | Hudec | B62K 25/04 280/283 |
| 9,242,693 B2 | 1/2016 | Voss | |
| 9,988,122 B2 | 6/2018 | Pedretti | |
| 2002/0180166 A1 | 12/2002 | Voss | |
| 2006/0063624 A1 | 3/2006 | Voss | |
| 2006/0064223 A1 | 3/2006 | Voss | |
| 2007/0063476 A1 | 3/2007 | Yu | |
| 2008/0035431 A1 | 2/2008 | Vroomen et al. | |
| 2008/0067772 A1 | 3/2008 | Weagle | |
| 2008/0238030 A1 | 10/2008 | Tseng | |
| 2008/0258517 A1 | 10/2008 | Julliard et al. | |
| 2008/0272560 A1 | 11/2008 | Voss | |
| 2009/0160156 A1 | 6/2009 | Yu | |
| 2009/0315296 A1 * | 12/2009 | Berthold | B62K 25/286 280/284 |
| 2009/0322055 A1 * | 12/2009 | Arraiz | B62K 25/286 280/284 |
| 2011/0233892 A1 | 9/2011 | Domahidy | |
| 2012/0126506 A1 * | 5/2012 | Zawistowski | B62K 25/28 280/275 |
| 2013/0020782 A1 | 1/2013 | Hoogendoorn | |
| 2014/0265208 A1 | 9/2014 | Voss | |
| 2014/0265227 A1 | 9/2014 | Voss | |
| 2015/0291244 A1 | 10/2015 | Hsu | |
| 2016/0031521 A1 | 2/2016 | Voss | |
| 2016/0083042 A1 | 3/2016 | Voss | |
| 2016/0368559 A1 | 12/2016 | Voss | |

FOREIGN PATENT DOCUMENTS

| | | |
|---|---|---|
| WO | 2001058748 A1 | 8/2001 |
| WO | 2012024697 A1 | 2/2012 |

OTHER PUBLICATIONS

International Search Report, Application No. PCT/US2014/026847, Inventor Darrell W Voss, Feb. 19, 2015, The International Bureau of WIPO, Geneva, Switzerland.

* cited by examiner

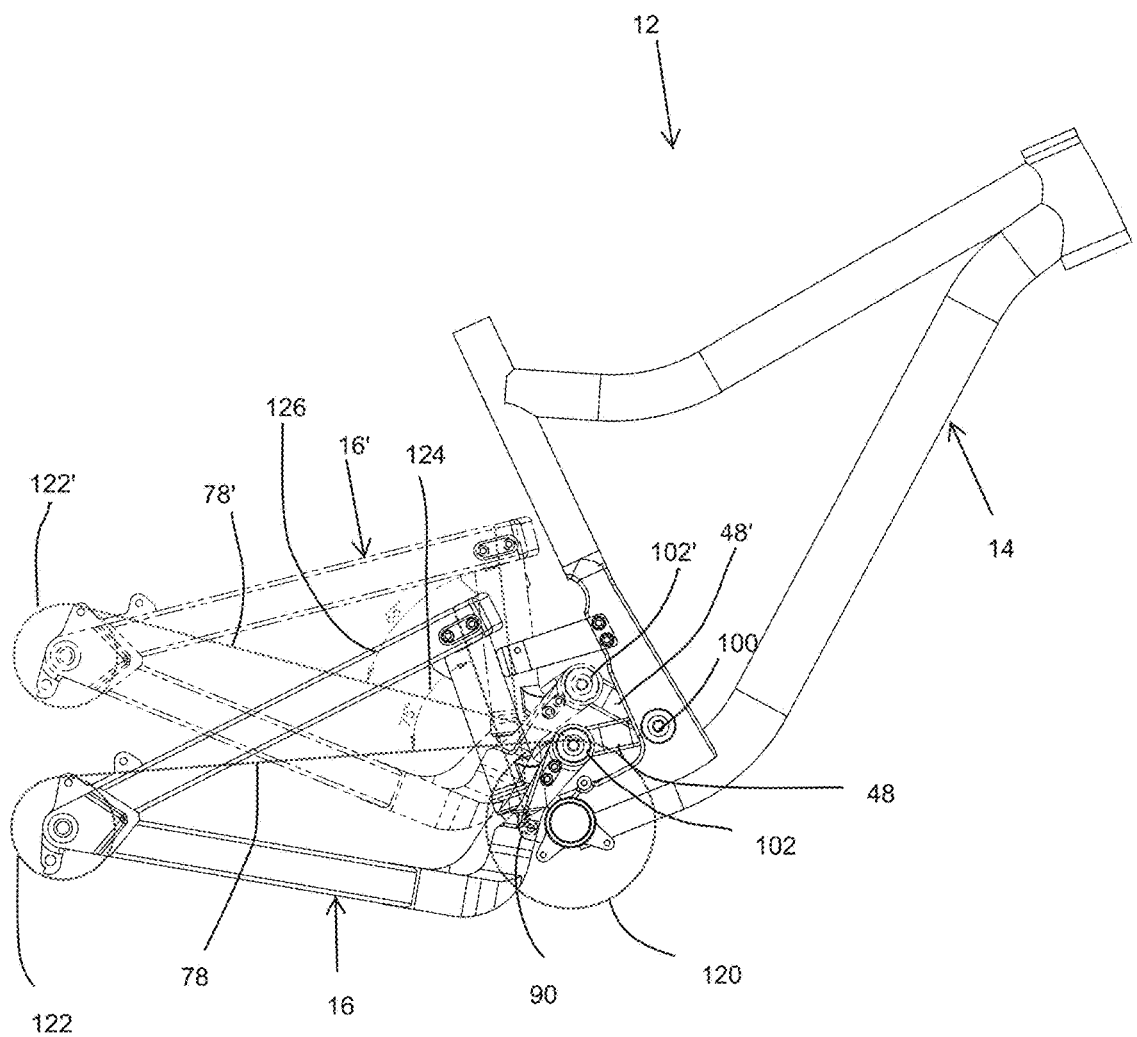

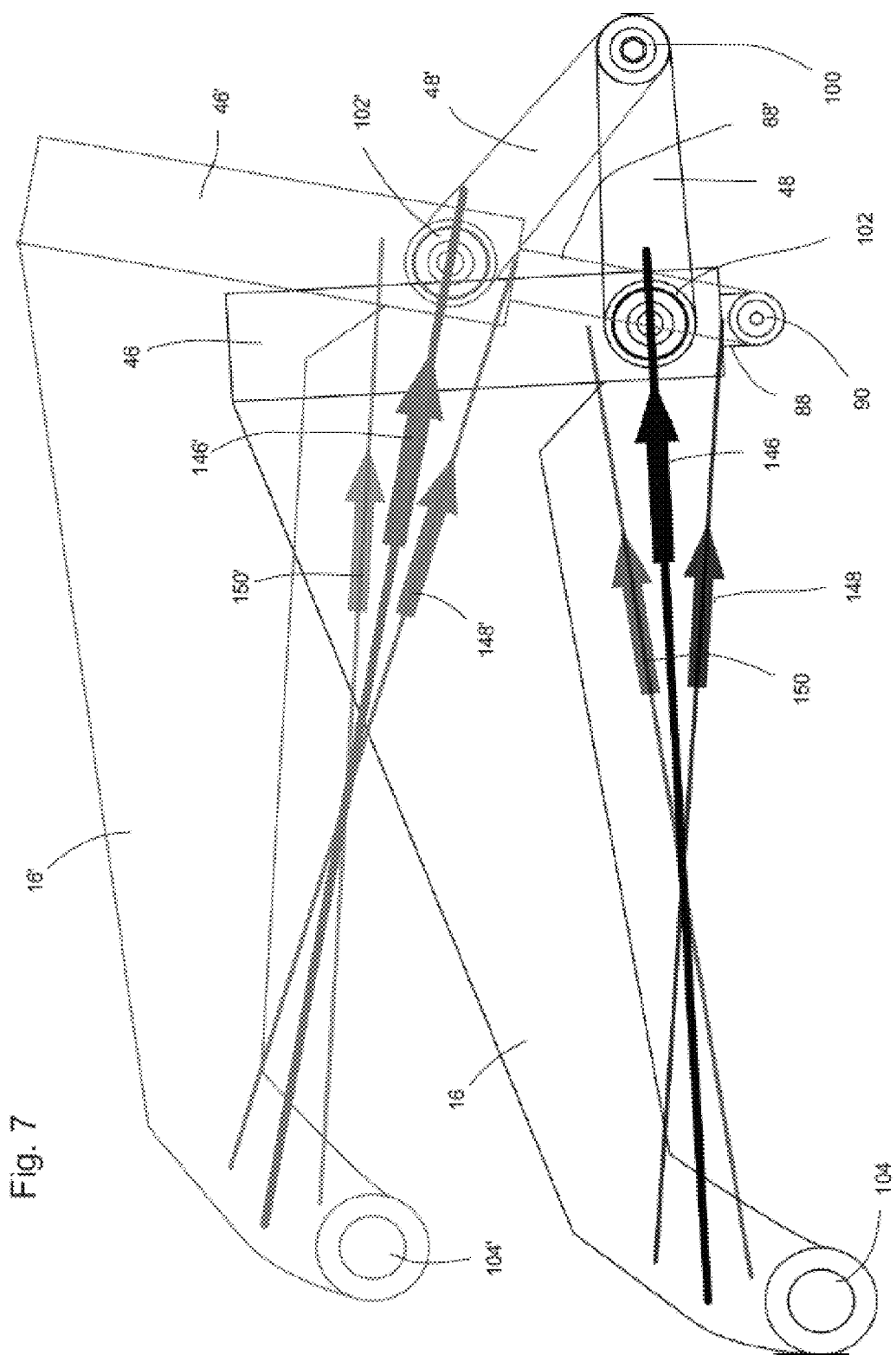

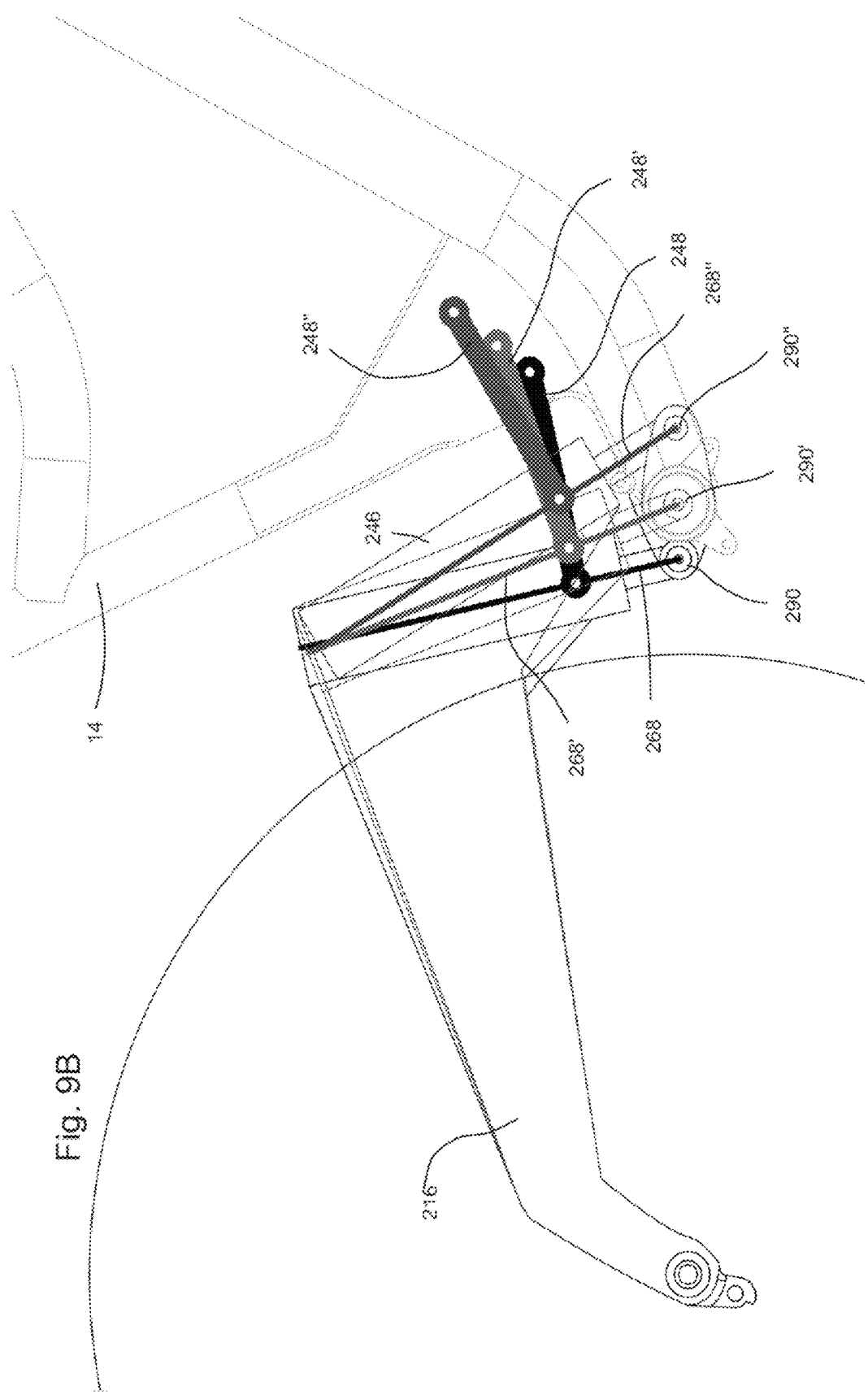

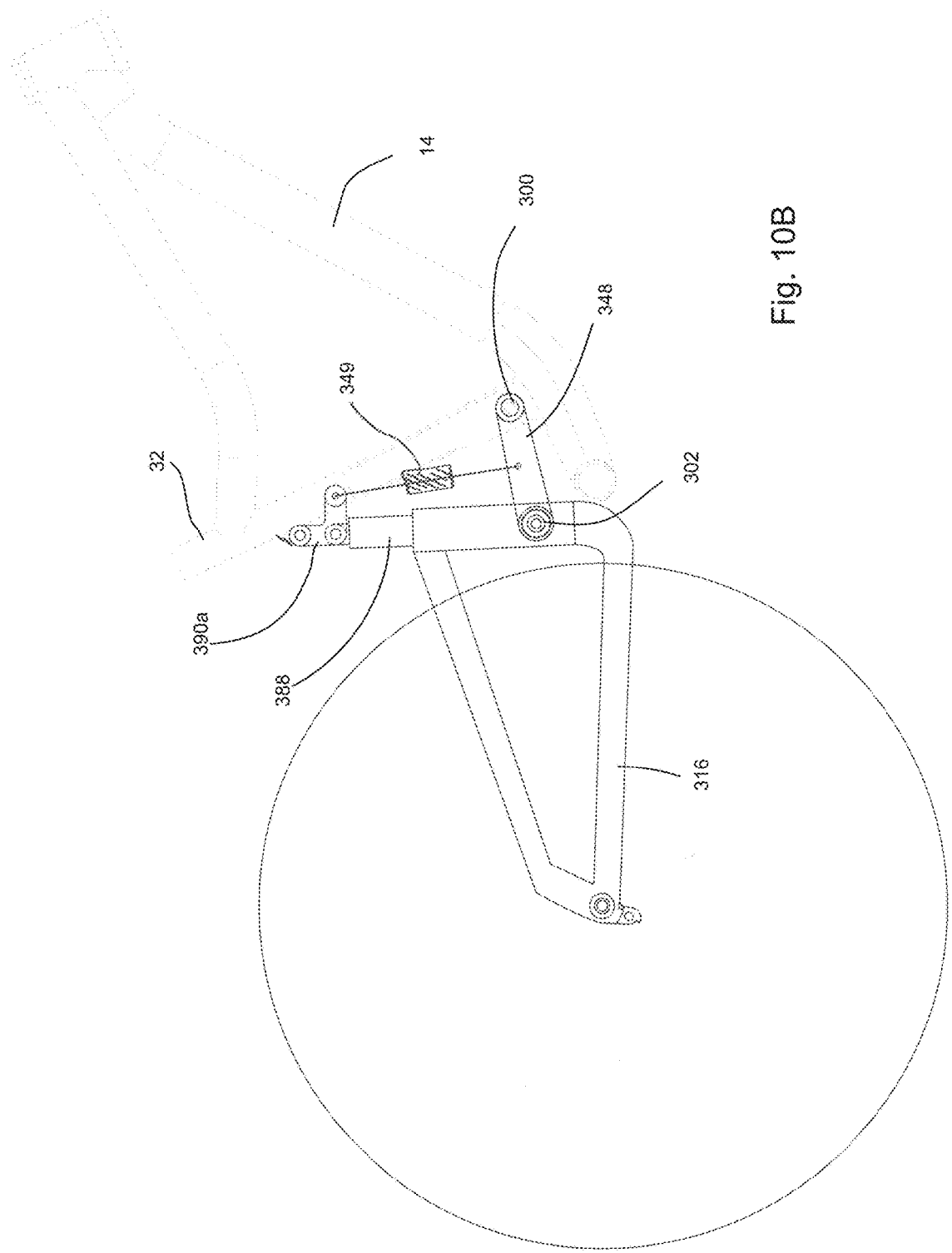

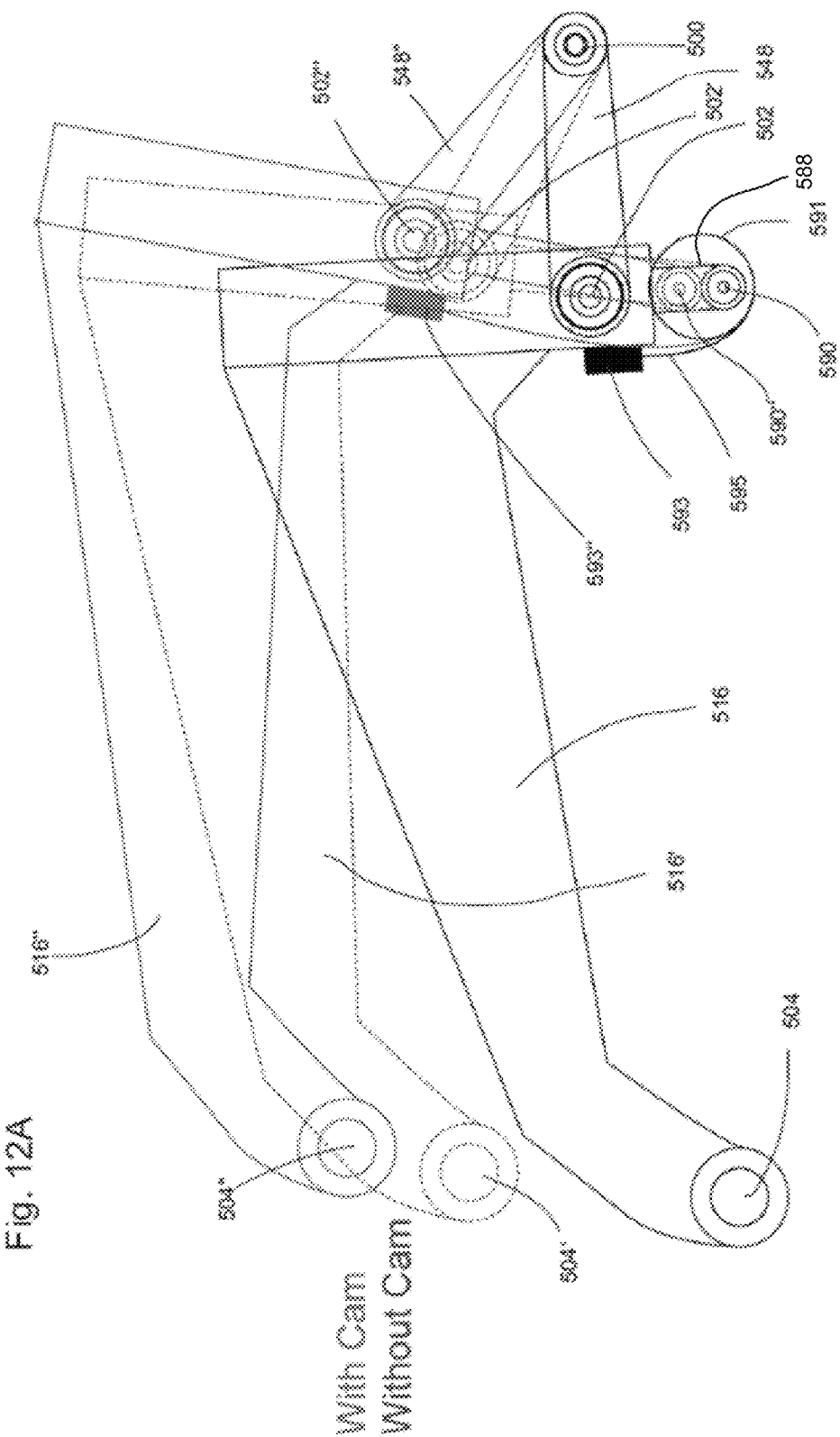

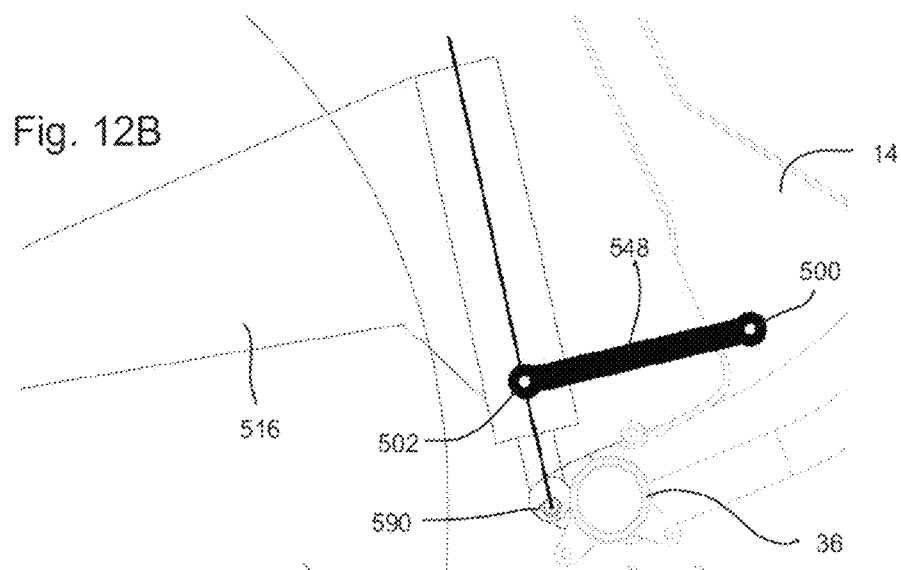
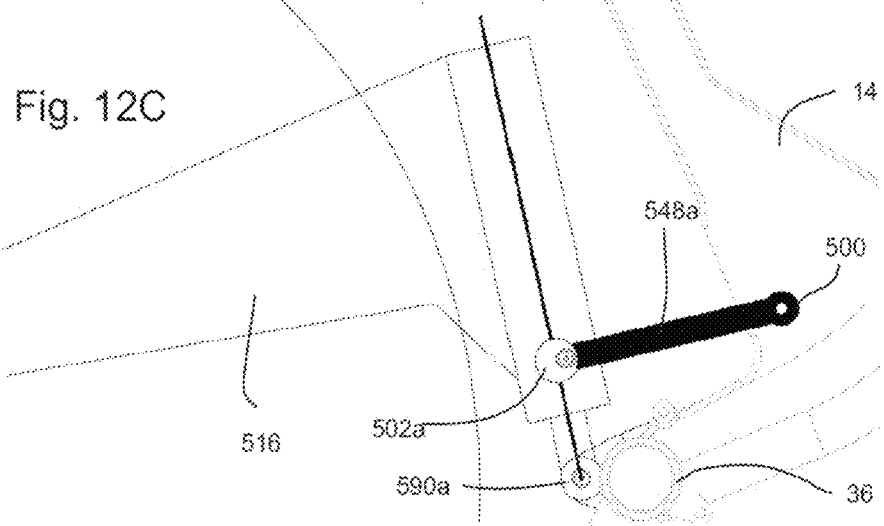
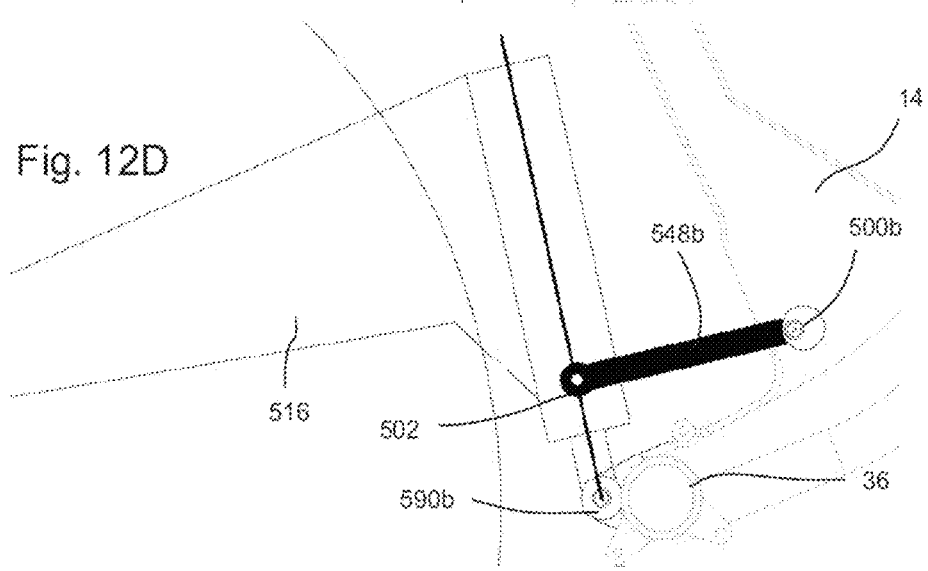

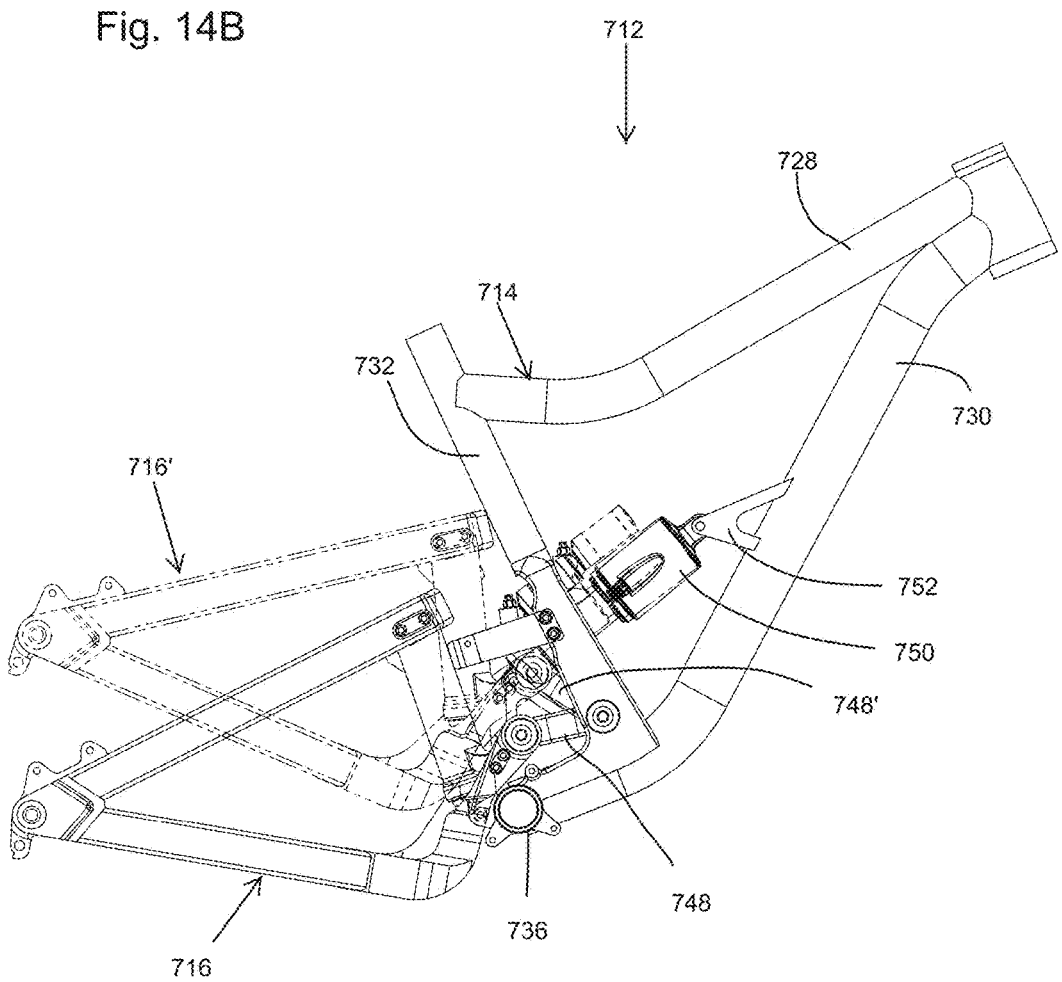

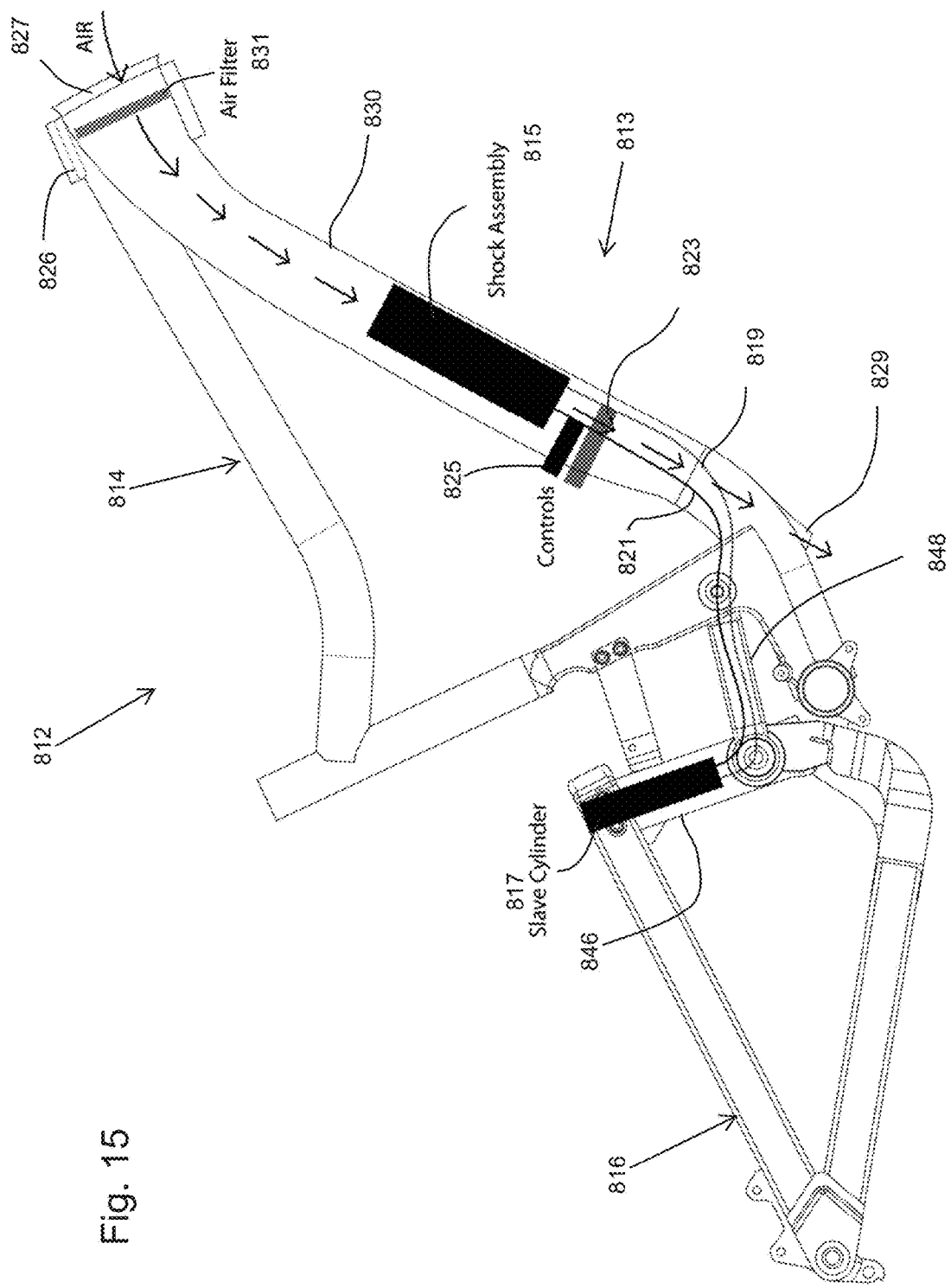

BICYCLE REAR SUSPENSION

CROSS REFERENCE TO RELATED APPLICATIONS

This application is a divisional of U.S. patent application Ser. No. 13/840,754 filed on Mar. 15, 2013, now U.S. Pat. No. 9,242,693 B2, issued on Jan. 26, 2016, the contents of which are herein incorporated in its entirety.

FIELD OF THE INVENTION

The field of the invention relates generally to a vehicle structure for carrying a rider and/or a payload. The invention relates more particularly to a rear suspension for vehicle.

BACKGROUND OF THE INVENTION

Bicycle frames may be equipped with no suspension, only a front suspension, or with both a front and rear suspension. Bicycles with only front suspension are referred to as hardtail bicycles. Bicycles with only a rear suspension are fairly uncommon, as bicycles with a rear suspension generally also have a front suspension. Bicycles with suspension in both the front and rear of the frame are referred to as full-suspension bikes.

In the distant past, bicycles often had no suspension other than the flex of the frame and softness of the pneumatic tires. Thus, the bicycles were essentially "rigid," such that the bicycle frame transmitted shock from riding on uneven terrain directly to the rider through the seat, pedals, and handlebars. The transmitted shock through the rigid frame to the rider resulted in discomfort to the rider. It also contributes to loss of control, especially with a mountain bike on rough terrain.

The most common frame design for a conventional upright bicycle consists of two triangles (i.e., a "diamond frame"), a main triangle forming the front of the frame and a paired triangle forming the rear of the frame. In the diamond frame, the main "triangle" consists of four tubes: the head tube, top tube, down tube and seat tube. The head tube contains the headset, which is the interface with the front forks and the handlebars—allowing them to rotate together relative to the frame. The top tube connects the head tube to the seat tube at the top of the frame. The down tube connects the head tube to the bottom bracket shell. The bottom bracket shell is located at the bottom of the seat tube. A bottom bracket is housed within the bottom bracket shell. The bottom bracket on a bicycle includes a crankset, which rotates. The bottom bracket comprises a spindle that houses the crankset and bearings, which allow the crankset to rotate relative to the spindle. The crankset is the component of a bicycle drivetrain that converts the reciprocating motion of the rider's legs into rotational motion used to drive the chain, which in turn drives the rear wheel. The crankset consists of one or more sprockets, also called chainrings attached to cranks to which the pedals attach.

The rear triangle consists of the seat tube connected by paired chain stays at the bottom of the seat tube and seat stays at an upper portion of the seat tube. The rear triangle connects to the rear fork ends or rear dropouts, where the rear wheel is attached. The rear fork ends include slots or apertures in the bicycle frame on each side of the rear wheel where the axle of a bicycle wheel is attached. The chain stays run connecting the bottom bracket to the rear fork ends. The seat stays connect the top of the seat tube, often located at or near the same point as the top tube, to the rear fork ends.

In order to reduce the discomfort associated with bicycles ridden on uneven terrain, suspension systems were developed. Besides providing comfort to the rider, suspension systems improve traction and safety by helping to keep one or both wheels in contact with the ground. Front suspension systems are often implemented using a telescopic fork configured as a shock absorber with a spring and damper in order to reduce transmitted shock. The implementation of the front suspension systems is relatively uncomplicated as the front wheel is supported by left and right forks that attach to a single head tube at the front of the bicycle frame. Rear suspension system designs may be more complicated due to the fact that the rear wheel is typically supported both by substantially horizontally oriented chain stays that are connected to the bottom bracket shell below the seat post and frame stays, which extend from the rear fork ends to an upper portion of the seat tube.

Rear bicycle frame suspensions are most commonly found in mountain bikes, due to the rough terrain experienced by mountain bike riders. The rear suspension, as with the front suspension, allows the rear wheel to move up and down relative to the rider to absorb shock forces and also to improve tire contact with the ground in rough terrain. Many early rear suspension designs included a shock absorber located between the rear frame and the seat post mounted in varying ways. Some rear suspensions also modified the conventional rear frame designs by utilizing additional frame members, or linking members between the conventional rear frame with the chain stays at the bottom of the seat tube and seat stays at an upper portion of the seat tube and the seat post. Some rear suspensions also modified the configuration of the seat tube.

The single pivot is the simplest type of rear suspension. The rear axle is held by a swingarm which is connected to the frame via a single pivot located on the bottom tube near the bottom bracket shell. When the suspension moves through its travel, the path the rear axle describes is a circle around the single pivot point. The rear triangle may simply be the swingarm. The rear shock may also be attached between the seat tube and the swingarm. This configuration of the single pivot design allows for a fairly linear leverage ratio between wheel travel and shock absorber travel. The main advantage of the single pivot design is its simplicity. It has few moving parts, few pivot points, is relatively easy to design and has good small bump compliance. Challenges with this single pivot design are brake jack and chain growth. Pedal induced forces and rider bobbing can rob the system of efficiency. Due to the limited power output of a human on a bicycle any lack of efficiency is undesirable. Some of these designs are heavy and tend to bounce up and down while a rider pedals. This movement takes power out of a rider's pedal stroke, especially during climbs.

Input from hard braking efforts also negatively affects full suspension designs. When a rider applies the brakes, some of these suspensions compress into their travel and lose some of their ability to absorb bumps. This may happen in situations where the rear suspension is needed most. When braking efforts cause the suspension to compress it is referred to as brake squat, when braking causes the suspension to extend it is called brake jack.

Some rear suspensions were designed to overcome or mitigate the above problems. One variation of single pivot suspension places the pivot in front of and above the bottom bracket, at a height above the smallest chain ring or higher.

This gives the design a significant amount of anti-squat when pedaling in smaller chain rings, which helps reduce loss of energy due to squat. This is particularly of importance on steep climbs, when one would use the smaller chain rings. However, this is a trade-off since the pivot's placement causes the design to suffer more from pedal kickback.

Another variation on the single pivot design is the split pivot design. The split pivot design is a special case of linkage driven single pivot in which one of the four-bar's pivot points coincides with the rear axle. This allows for the disc brake caliper to be mounted on the floating linkage instead of on the swingarm. As a result of this the braking torque now interacts with the suspension via the floating linkage. The linkages can be designed such that this has a positive effect on suspension performance under braking, typically reducing brake jack. Furthermore, the relative rotation between brake disc and brake caliper as the suspension goes through its travel is different from that in single pivot designs. The four linkages in a split pivot design influence how braking torque is transmitted, how the brake caliper moves in relation to the disc and influence the leverage ratio between wheel travel and shock travel. Since these influences may have a different optimum linkage design, the bike's design has to strike a balance.

Other suspension designs rely on the shock absorber design to reduce pedal-induced bobbing and squat. There are many additional rear suspension designs in the prior art. However, a need exists in the art for further improvements of bicycle rear suspension systems to further improve the performance of the rear suspension under braking, acceleration, and further improved anti-squat anti-dive characteristics without complicating trade-offs in performance.

SUMMARY OF THE INVENTION

The present invention solves the above need in the art with a linked suspension system that maintains the instant center of rotation rearward of the front frame of the vehicle. The system is usable on most any type of ground-engaging vehicle to improve the suspension action. Thus, the shocks and springs of the suspension do not have to be as specially designed and tuned to deal with pedal-induced forces, braking forces, rider bob and other inputs. The suspension linkage design itself cancels or counters much of the undesirable, energy and control-robbing movements.

The invention provides a vehicle (a bicycle in the preferred embodiment) that includes a front frame member, a rear arm, a drive train, and a suspension. The front frame member is secured to a front wheel and a bottom bracket shell. The rear arm is coupled to the front frame member and rotatably secures a rear wheel at its axle. The drive train is coupled between the bottom bracket shell and the rear wheel. The suspension is engaged between the front frame member and the rear arm. In the preferred embodiment, the suspension has an instant center of rotation rearward of the bottom bracket and forward of the rear axle.

The bicycle drive train includes a flexible drive member coupled between the bottom bracket shell and the rear axle. With this arrangement, the suspension has an instant center of force rearward of the bottom bracket and forward of the rear axle.

As mentioned above, the drive train is drivingly coupled to the ground-engaging member. It includes a tension member that pulls from the frame to the ground-engaging member to propel the vehicle. In some embodiments of the invention, the drive train includes a gearbox. In one form, the gearbox spans the control link. In another, the gearbox forms the control link. In another embodiment, the gear box extends from the bottom bracket to a forward pivot connection of the control link.

The suspension has a slide link coupled to the frame and to the rear arm. The slide link is rotationally fixed to the arm to rotationally move therewith. The slide link is pivotally secured to the frame to rotate relative to the frame. The suspension further includes a control link coupled to the frame and to the arm. The control link completes the basic linkage arrangement to control the movement of the rear swingarm relative to the front frame (e.g., the front triangle).

Preferably, the slide link includes a slider that moves along a path generally within 30 degrees of vertical. The path of the slider is linear relative to the rear arm. The slider is pivotally connected to the front frame adjacent the bottom bracket shell. The axis of the slider preferably maintains an acute angle between 50 and 90 degrees with a top run of the flexible drive member during the full range of suspension travel and gearing combinations. More preferably, the angle maintained is between 55 and 85 degrees.

The invention may apply to most vehicles that can benefit from a suspension for traveling over ground (including dirt, pavement, snow, etc.) on a ground-engaging member (such as wheels, skis, a track, etc.). The vehicle includes a frame member to be suspended relative to the ground. The suspension of the invention includes an arm (such as a swingarm), a slide link, and a control link. The arm having a first end and a second end; it extends between the frame generally at the first end and the ground-engaging member generally at the second end. The slide link is coupled between the frame and the arm. The slide link is rotationally fixed to the arm to rotationally move therewith. It is pivotally secured to the frame. The control link is also coupled to the frame and to the arm.

The ground-engaging member follows a suspension travel path. The slide link includes a slider that follows a path oriented within about 30 to 45 degrees of parallel to the suspension travel path. The slider not be rotatable relative to the arm, it follows a linear path relative to the arm as it extends into and partially out of a cylinder to which it is mated. The cylinder is rigidly secured to the arm. The opposite end of the slider from its mating engagement with the cylinder is pivotally secured to the frame.

When the vehicle is a bicycle, the frame including a bottom bracket shell, the slider is pivotally secured adjacent the bottom bracket shell. The forward end of the control arm link is preferably pivotally secured to a lower end of the bicycle seat tube, forward of the bottom bracket shell. The rearward end of the control arm link is pivotally secured to the arm.

The slide link in one embodiment includes a spring within the cylinder. Preferably, the slide link is a pull shock. Alternatively it may be a compression shock. In this arrangement the slider preferably extends upwardly from the cylinder to an attachment to the upper portion of the seat tube. Along with the spring the cylinder houses a damping fluid in one preferred embodiment. Ideally, the spring is pneumatic for many applications. The slider is alternatively arranged to follow a linear or an arcuate path relative to the arm.

The control link also guides the movement of the rear suspension along with the slide link. In one embodiment, the control link is pivotally secured to the frame at a location substantially in line with a path of the tension portion of the flexible drive member. The control link comprises a rigid member pivotally secured to the arm and pivotally secured to the frame. At least one of the two pivots are location adjustable. In another embodiment, the coupling of the slide link to the frame is also location adjustable.

In further preferred embodiments of the present invention, the coupling of the slide link to the frame is actively adjustable during riding of the vehicle to extend the travel of the arm under predetermined conditions. The active adjustment occurs at predetermined threshold conditions of at least one of position, velocity, and acceleration of the movement of the arm relative to the frame. Such movement is preferably more specifically between the slider mount and the slide cylinder. The adjustment is carried out by a cam rotationally mounted to the frame, the slide link being pivotally mounted to the cam. A clutch secured to the arm with a cable extending from the clutch to the cam. The cable drives the cam when the clutch securely grasps the cable. Thus, the clutch includes a mechanism to grasp the cable under predetermined conditions position, velocity, and/or acceleration.

In another preferred aspect of the invention, a shock secured between the arm and the frame. A spring is also secured between the arm and the frame. The spring is pivotally coupled to the front triangle and to the seat stays of the rear triangle. In an alternate embodiment, the spring is pivotally coupled between the control link and the front triangle.

Instead of a spring and damper discussed above, the suspension of one embodiment includes a hydro-pneumatic shock secured between the arm and the frame. Preferably, the hydro-pneumatic shock includes a slave cylinder secured to the slide link on the arm. It also includes a master cylinder holding at least one fluid secured to the frame. Valves between the master cylinder and the slave cylinder control the damping and spring variables.

BRIEF DESCRIPTION OF THE DRAWINGS

Preferred and alternative examples of the present invention are described in detail below with reference to the following drawings:

FIG. 5B is a side-elevational view of the frameset of FIG. 2 showing the chain tension angles under intermediate gearing combinations relative to the suspension components;

FIG. 7 illustrates chain tension vectors at different gearing combinations relative to the control arm pivots of one preferred embodiment of the present invention;

FIG. 9B is a simplified view of the suspension of FIG. 9A showing potential alternate slider mount locations and link mount locations with the corresponding effect on the slider axis;

FIG. 10B is a side-elevational view of an alternate rear linkage configuration of the present invention;

FIG. 12A shows the range of movement of a rear linkage arrangement similar to that of FIG. 9A with and without an extended travel cam and clutch mechanism;

FIGS. 12B-D provide schematic views of differing placements of the cam mechanism;

FIG. 14B is a view of the embodiment of FIG. 14A showing range of movement of the rear triangle;

FIG. 15 is a side elevational view showing a somewhat schematic representation of a hydro-pneumatic shock and spring assembly used with a rear suspension configuration;

DETAILED DESCRIPTION OF THE PREFERRED EMBODIMENTS

Figure 1:
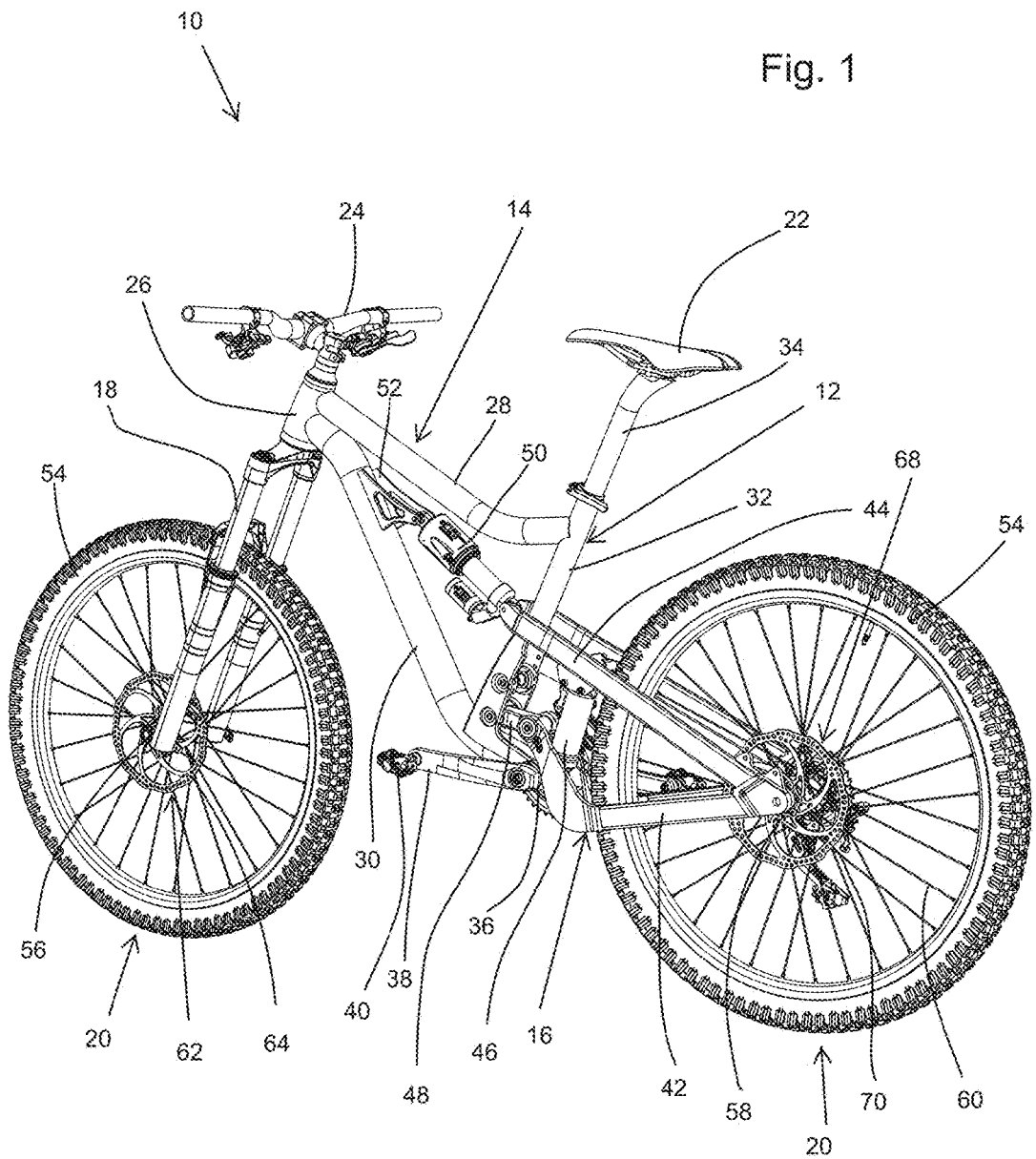
FIG. 1 illustrates an isometric view of a bicycle having a rear suspension according to an embodiment of the present invention.

FIG. 1 illustrates an isometric view of a bicycle 10 according to one embodiment of the present invention. As with most conventional bicycles, the bicycle 10 includes a frame 12, a front triangle 14, a rear triangle 16, front forks 18, wheels 20, seat 22, and handlebars 24. The front triangle includes a head tube 26, a top tube 28, a down tube 30, and a seat tube 32. The top tube 28 extends between the seat tube 32 and the head tube 26. The down tube extends between the head tube 26 and the seat tube 32. This front triangle arrangement is used here as one preferred way of constructing a bicycle. However, alternate constructions may be used with the suspension of the present invention. For example a single enlarged down tube could take the place of the seat tube, the down tube, and the top tube.

The front triangle also secures the seat post 34 with the seat 22 mounted thereon. The seat post is secured to the top of the seat tube 32. The bottom bracket shell 36 is secured to the lower ends of the down tube and seat tube. In our present preferred configuration the seat tube 32 may be considered to intersect the down tube forward of the bottom bracket shell. Alternatively, the configuration may be described as the down tube 30 stopping before the bottom bracket shell with the seat tube extending rearwardly after it intersects the down tube 30. In any case, the bottom bracket is journalled within the bottom bracket shell 36, the cranks

38 being attached to the sides of the bottom bracket. The pedals 40 are secured to the ends of the cranks 38.

Likewise, with the rear triangle, certain configurations are shown and described herein. However, even as we discuss a "rear triangle" herein, the term should be interpreted more broadly to encompass any rear arm or set of rear arms that extend rearwardly to hold the rear wheel. Thus, a rear swingarm may essentially be the "rear triangle" herein in some embodiments. The rear triangle 16 in one preferred embodiment actually forms a triangle with chain stays 42, seat stays 44, and a slider link cylinder 46 forming the final side of the triangle. These three rigid members are rigidly secured to one another in this preferred embodiment. The seat stays 44 and the chain stays 42 are fixed to each other through the rear axle mount brackets 104 (in some forms referred to in the industry as "rear dropouts"). The brackets 104 have the rear wheel axle extending between them. A portion of the seat stays 44 forward of the rear wheel 20 is fastened to the top of the cylinder 46. Likewise, a forward portion of the chain stays 42 forward of the rear wheel 20 is fastened to a lower end of the cylinder 46. Thus, the three rigid elements form a triangle that is, in this embodiment, the rear triangle 16.

This rear triangle moves as one with rear suspension movement. Relative movement between the rear triangle 16 and the front triangle 14 is allowed to occur due to the linkage arrangement between these two "triangles." Obviously two of the links are the front and rear triangles themselves (or maybe more specifically, portions of the front and rear triangles: the cylinder 46 of the rear triangle and the seat tube-to-BB-shell portion of the front triangle). The third link in the four-bar linkage assembly is the control arm link 48. The fourth element (or "link") is the slider 88 (best viewed in FIG. 3). The link is shown in FIG. 1, extending between the forward arms of the chain stays 44 and a lower end of the seat tube 32 and pivoted on both ends. The slider 88 is hidden in the view of FIG. 1 behind the forward arms of the chain stays. As seen in the exploded view of FIG. 3, the slider 88 extends between the cylinder 46 (in which it slides) and a mount to the rear of the bottom bracket (BB) shell. The movement of the four element linkage configurations of the embodiments of the present invention will be described in more detail below.

The embodiment of FIG. 1 employs a separate shock absorber and spring assembly 50. It is mounted to the front of seat stays 44 that, in this embodiment, extend forward of cylinder 46 around the sides of seat tube 32 to mount to the rear of shock 50. The forward end of shock 50 is secured to the down tube 30 with a shock mount bracket 52. The forward and rearward ends of shock 50 are pivotally secured such that it does not constrain the movement of the four-element linkage previously described. Shock 50 includes both a spring (preferably an internal air spring) and a damper (preferably hydraulic) all within the same assembly. Other springs and dampers may alternatively be used.

Note that the angle at which the shock 50 is mounted affects the effective spring rate of the system. So, for example, if the shock 50 is in line with the movement of the forward end the chain stays 44 where the shock's rearward end is mounted, the effective spring rate will be near the natural spring rate of the spring. However, if the movement of rear mount of the shock 50 becomes more out of alignment with the shock itself as the suspension compresses, the effective rate will be more regressive than the natural spring rate. Conversely, if the uncompressed alignment of the shock is far out of alignment with the movement of the shock's rear end mount, and the alignment increases with shock compression, the effective rate will be more progressive. Thus, the mounting configuration of the shock can be tailored to refine the suspension characteristics as desired based on the shock, the linkages, and the type of riding targeted. The mounts can also be configured to be changed by the user to tune the suspension to differing uses. FIGS. 13 and 14 illustrate these characteristics as well.

FIG. 1 also illustrates some of the details of the wheel assemblies. Tires 54 are held on the rims. Spokes 60 extend from the rims to the front and rear hubs 56, 58. Front and rear axles extend through the hubs to rotatably secure the wheels to the front forks 18 and rear triangle 16. Front brakes 62 are secured between the front hub 56 and the forks 18. A front disc 64 is mounted to the front hub, while brake calipers (not shown) are mounted to the left fork leg. Likewise, the rear brakes 68 are secured between the rear hub 58 and the rear triangle 16. A rear disc 70 is secured to the hub to rotate therewith while brake calipers are secured to the left seat stay.

The drive train of the bicycle 10 is only partially seen in the view of FIG. 1. However, it may be of conventional construction or employ non-conventional elements, some of which will be described below. The conventional construction includes front chain rings 74 and a rear cogset 76 (not well seen in FIG. 1). A chain 78 (not shown in FIG. 1) extends between the front chain rings and the rear cogset. Front and rear derailleurs are used to shift gears. The derailleurs are secured with hangers from the seat tube and from the rear mount brackets 104 (rear right dropout, see FIG. 2).

Figure 2:
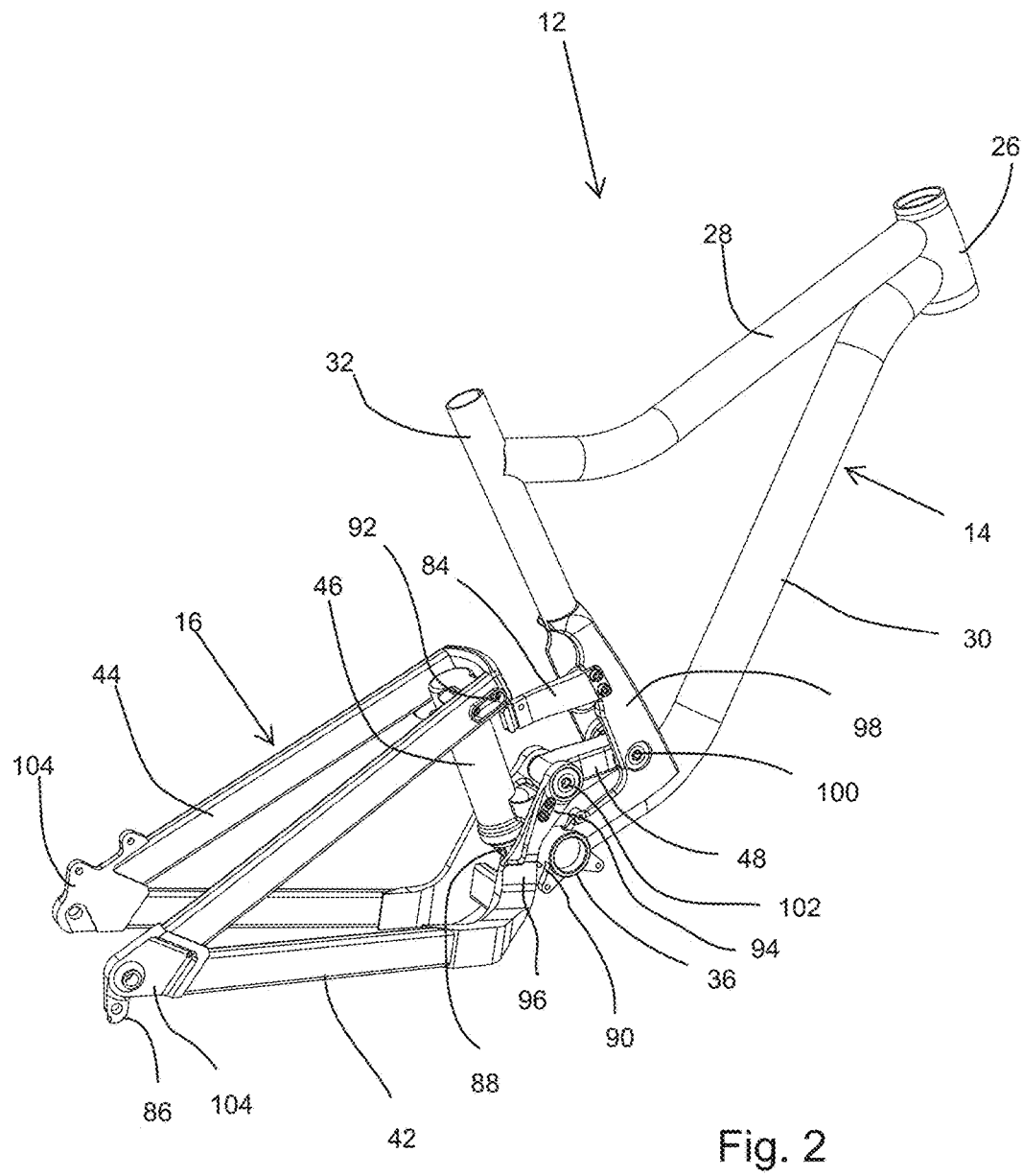
FIG. 2 is an isometric view of a frameset according to one embodiment of the invention.
Figure 3:
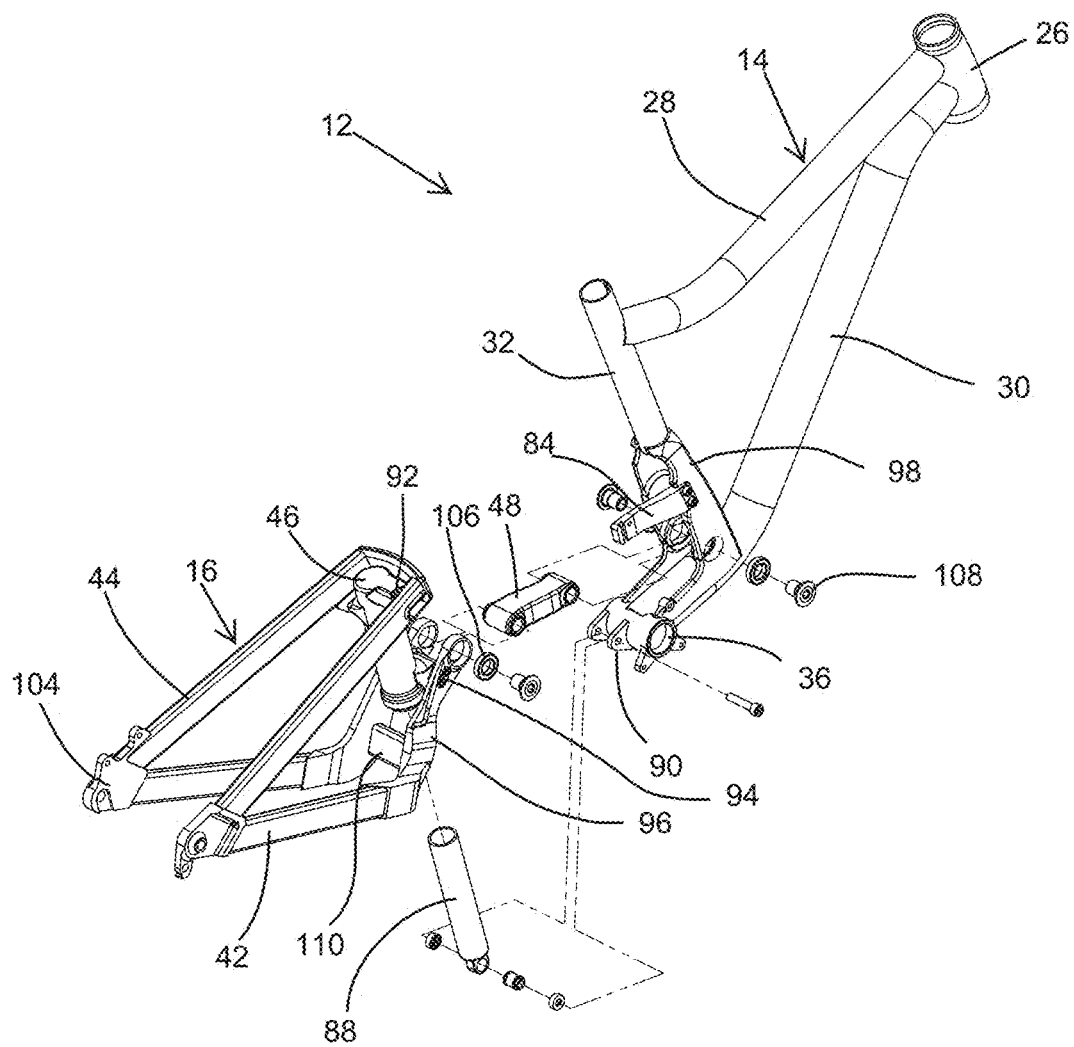
FIG. 3 is a partially exploded isometric view of the frameset of FIG. 2.

FIGS. 2 and 3 illustrate a slightly different embodiment in that the spring and damper are contained in the cylinder 46. A slider 88 (FIG. 3) is slidably received in the cylinder 46 to form a pull shock. In other words, as the suspension "compresses" (i.e., the rear wheel rises relative to the front triangle 14) the slider 88 extends further out of the cylinder 46. As seen in FIG. 3, the lower end of the slider is pivotally mounted to a slider BB mount 90 on the rear of the BB shell. Thus, the slider does not translate relative to the front triangle 14. The slider translates relative to the cylinder 46 and the rear triangle 16 and slightly pivots relative to the front triangle 14 as the suspension moves.

The top of the cylinder 46 is rigidly fastened to the forward end of the seat stays 44 with an upper cylinder mount 92. In the preferred arrangement, bolts are placed through the forward end of the right seat stay and into threads in the mount 92 projecting laterally from the top of the cylinder. Alternatively, the other or both sides of the cylinder 46 are attached to the seat stays 44. A lower cylinder mount 94 preferably extends forward from the lower end of the cylinder 46. The lower mount 94 is secured between chain stay arms 96 that extend upwardly and forwardly beyond the lower end of slider 88. The shape of the arms 96 is dictated by packaging requirements to fit between the rear wheel and the BB shell 36 and to provide the desired geometry for the four-bar linkage assembly. Note that an arm brace 110 is also provided between the chain stay arms upper and lower ends, just rearward of the lower end of the slider 88.

As mentioned above, the slider 88 forms one link of the four-element linkage arrangement of the present invention. The other link is the control arm link 48. It extends between upper ends of the chain stay arms 96 and the lower end of the seat tube 32. The lower end of the seat tube 32 is formed into a lower channel 98 that has a "C" cross-sectional shape. This shape facilitates the mounting of the forward end of the control arm link 48. It also provides a convenient mounting location for the front derailleur hanger 84 above a forward link pivot 100. The rearward link pivot is at 102. The link pivots 100, 102 are secured with bushings 106 and fasteners 108 through apertures in the seat tube lower channel 98 and the upper ends of the chain stay arms 96. The locations of these pivots 100, 102 affect the suspension motion, as will be explained in more detail below.

Figure 4:
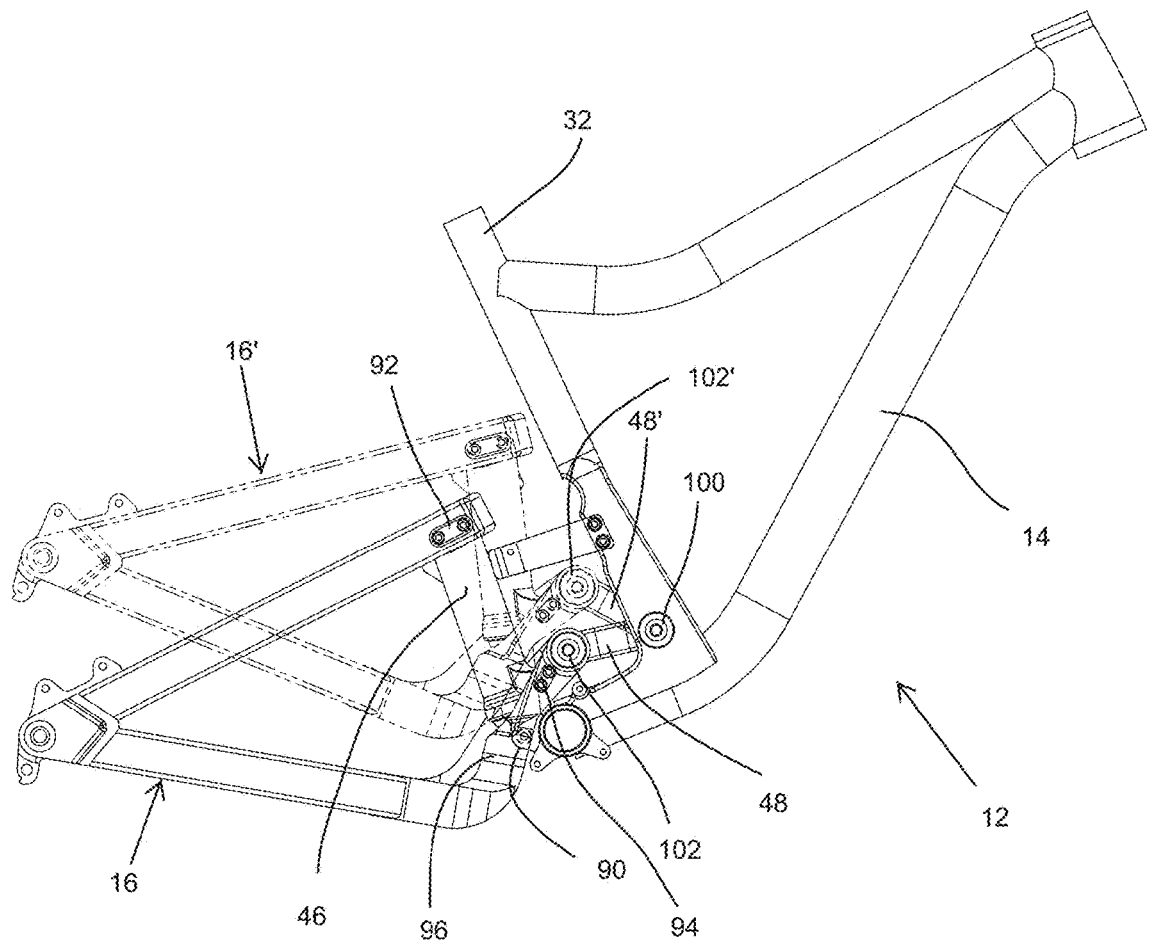
FIG. 4 is a side-elevational view of the frameset of FIG. 2 showing the range of movement of the rear suspension.

FIG. 4 illustrates movement of the rear triangle 16 relative to the front triangle 14 along the path prescribed by the four-bar linkage discussed above. As the rear wheel is pushed upwardly relative to the rider and front triangle 14 (or conversely, as the rider pushes the front triangle down relative to the ground and the rear wheel), the rear triangle 16 moves relative to the front triangle 14. The movement is constrained by the two links connecting the front and rear triangles 14, 16, namely the slider 88 and the control arm link 48.

The slider 88 is pulled partially from within the cylinder 46 as the cylinder 46 travels upwardly relative to the slider BB mount 90 to which the slider lower end is pivotally secured. Thus, the slider/cylinder arrangement forms a pull shock. A spring (preferably an air spring) and damper is housed within the cylinder and is compressed by the slider 88 when it is pulled outwardly from the cylinder 46. The movement of the slider is translational relative to the cylinder 46 and entire rear triangle 16 and it is pivotal with regard to the BB mount 90 and the entire front triangle 14. The pivotal path is defined by the control arm link 48. Note as rear triangle 16 move to position 16', the control arm link moves to position 48'. In this position, the rearward link pivot 102 moves significantly upward and forward of its original location. Note that the axis of the cylinder rotates slightly forward from the non-compressed to the compressed state.

Figure 6:
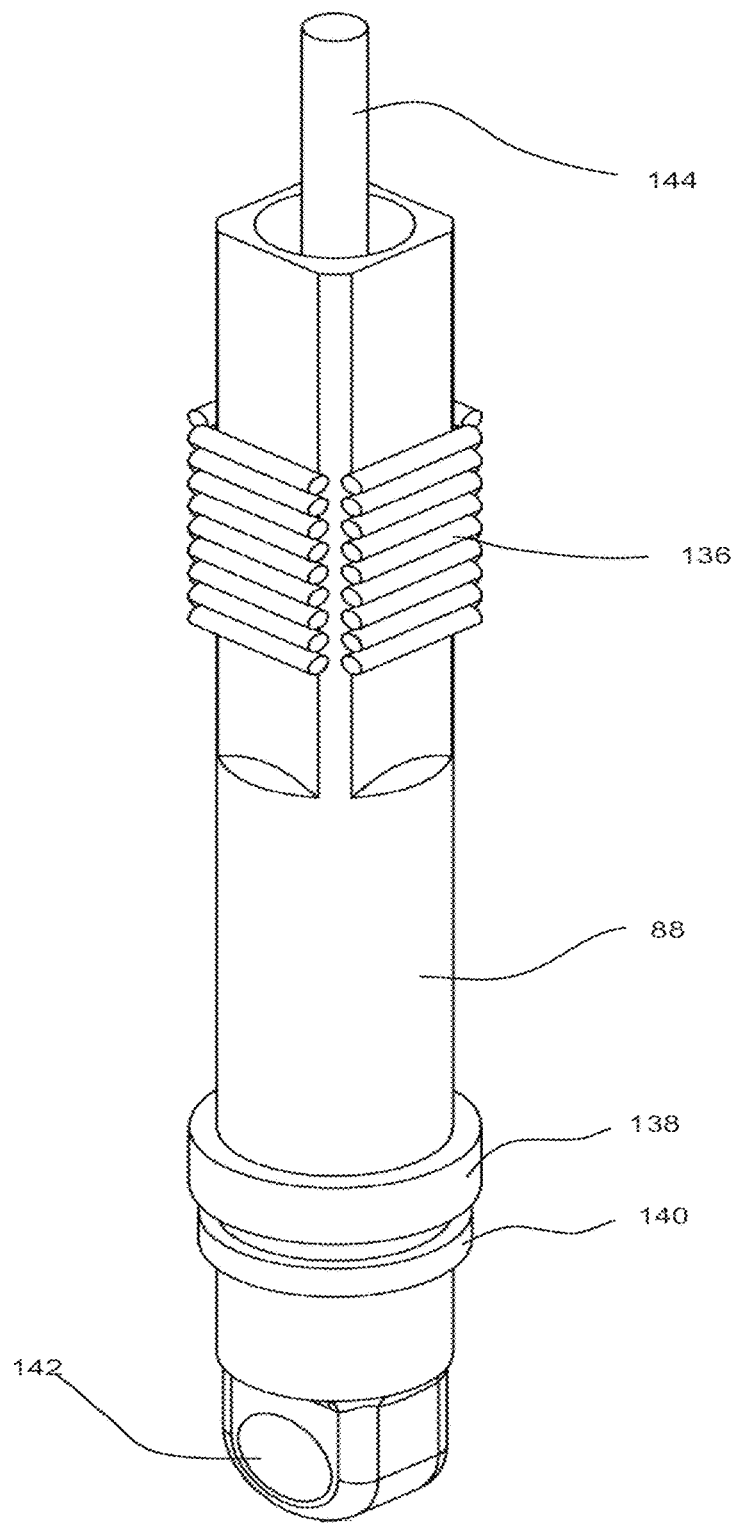
FIG. 6 is an elevational view of the slider link of one embodiment of the present invention.

Before proceeding with further details of the linkage and its movement, some further understanding of the slider 88 will be explained in relation to FIG. 6. The slider 88 includes needle bearings at its upper end to slide freely within cylinder 46 even under heavy fore and aft loads as the slider 88 is largely extended from the cylinder 46. At the suspension-compressed position of the rear triangle 16' (see FIG. 4), the slider's needle bearings hold the alignment of the rear triangle 16' between them and the control arm link 48' with small "lever arm" between these two elements to counter the upward and rearward forces. The lower end of the slider 88 includes a bushing 138. The engagement of the bushing does not see as high of forces since it is closer to the lower end of the slider 88 and a slider mount fixture that is secured to the slider BB mount 90. A seal 140 is provided beneath the bushing 138 to contain fluid—potentially including air or hydraulic fluid.

Under certain arrangements, such as with an external shock 50 (as seen in FIGS. 1 and 13), the loads on the upper portion of the slider 88 are diminished, as they are transferred to the shock 50. In such instances, two (or more) bushings may be used within the slider instead of the needle bearings 136 and the single bushing 138.

The upper end of slider 88 includes a rod 144 that is part of the damping system with a piston on the lower end thereof (not shown) that may provide hydraulic damping of the shock. A spring, such as coil or pneumatic, is also housed within the slider or between the slider and the cylinder.

Figure 5A:
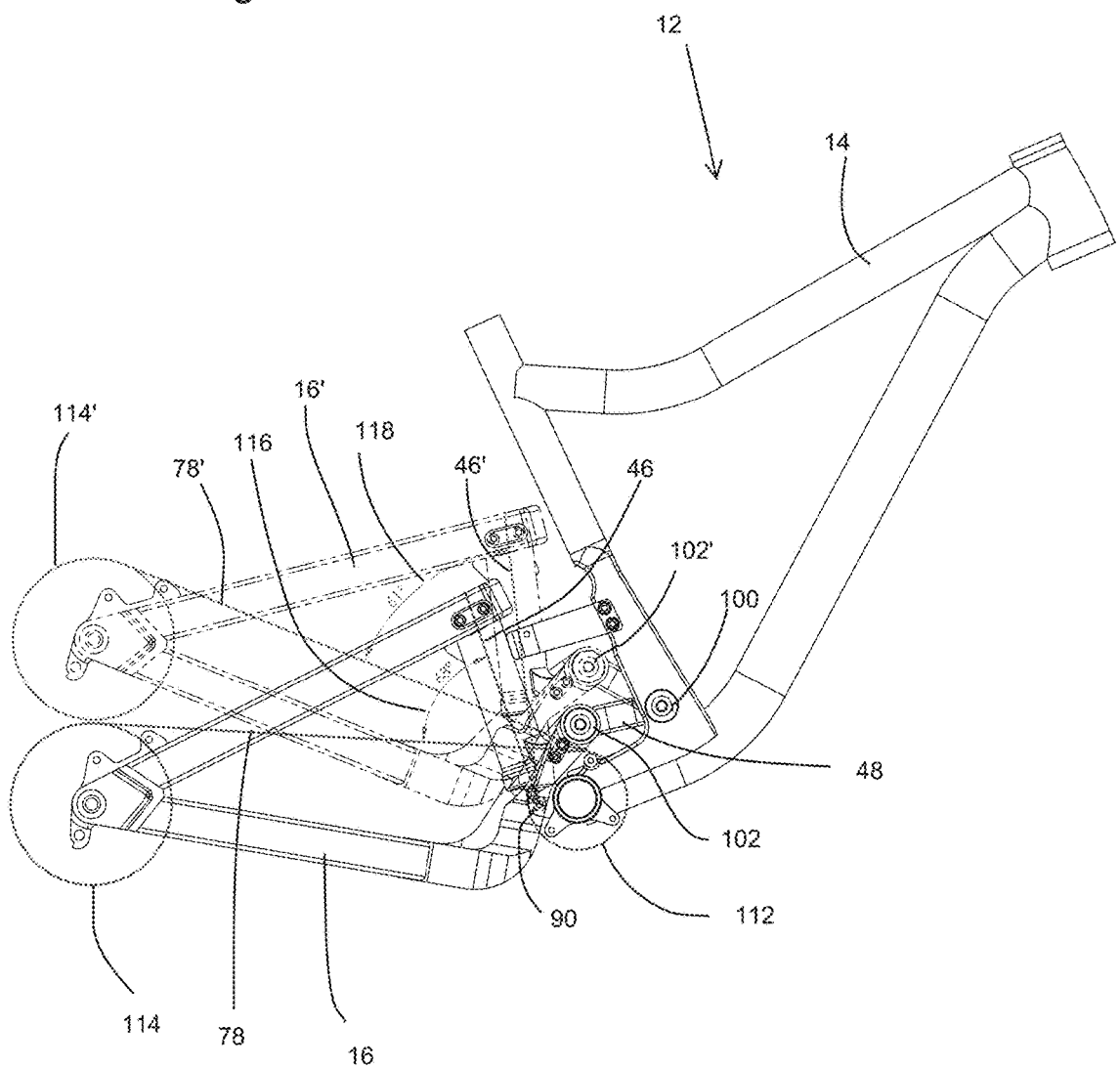
FIG. 5A is a side-elevational view of the frameset of FIG. 2 showing the chain tension angles under low gearing combinations relative to the suspension components.
Figure 5C:
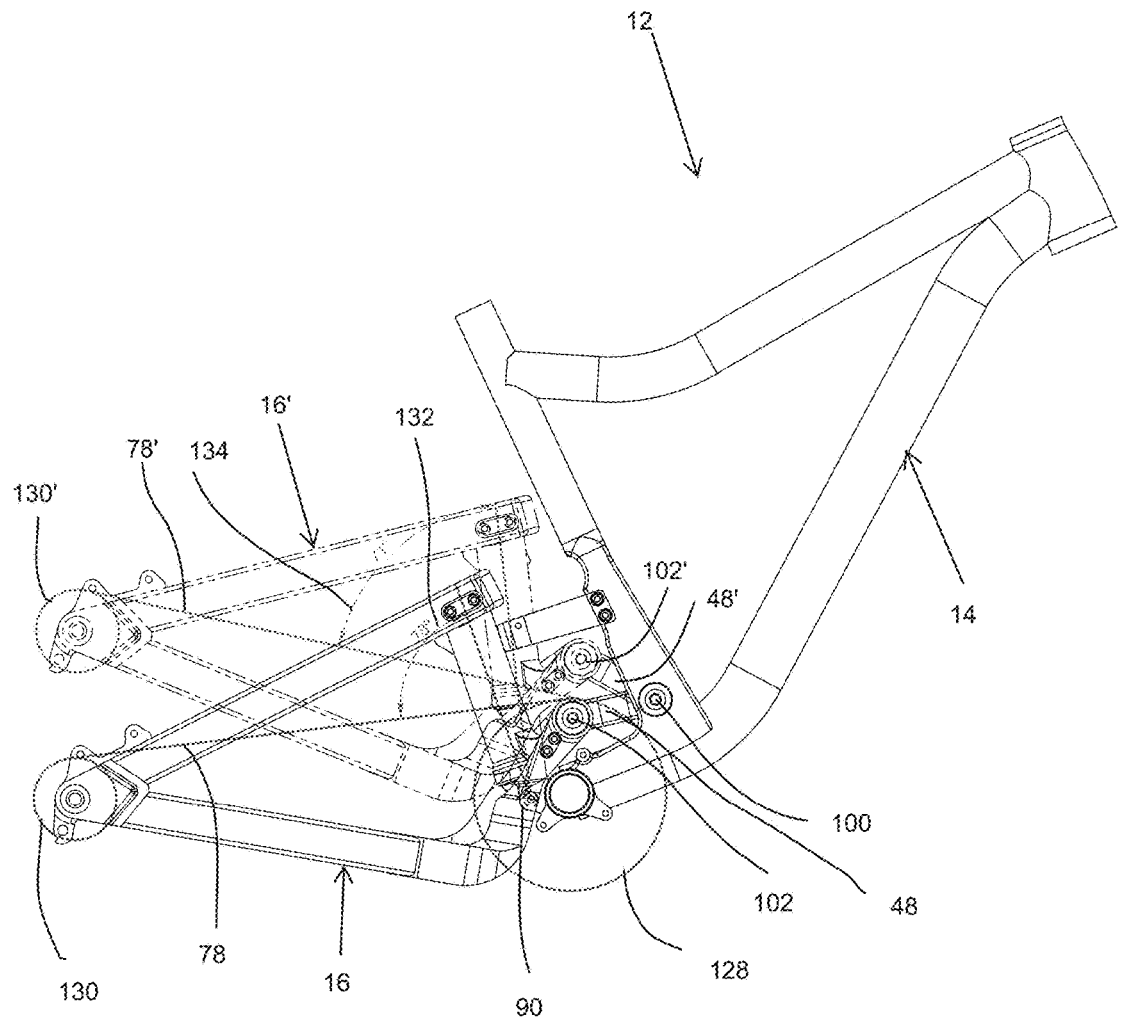
FIG. 5C is a side-elevational view of the frameset of FIG. 2 showing the chain tension angles under high gearing combinations relative to the suspension components.

With a further understanding of the slider 88 and cylinder 46 arrangement in the four-bar linkage of the present invention, the movement and forces on the suspension system are better defined. FIGS. 5A-C illustrate the chain pull line relative to the slider 88 in the non-compressed and compressed states at various low/high and high/low gear combinations. FIG. 5A shows a combination of a small front chain ring 112 with a large rear sprocket 114. This presents a typical climbing configuration for a mountain bike. When climbing, efficiency is important; any loss of energy is felt, whether it be pedal induced suspension squat, rider bob, or a too stiff suspension with reduced traction causing slippage. As can be seen in this figure, the angle between the slider 88 (or the axis of the cylinder 46) and the chain line 78 while on these gears creates an acute angle, preferably of about 68 degrees (first uncompressed pull angle). Thus, absent other considerations, the force of the chain tends to slightly pull the cylinder 46 down toward the BB mount 90. This slightly stiffens the suspension action, which may be desirable in climbing situations. However, note that the effect is somewhat slight, as the component of pull along the axis of the slider 88 would only be the cosine of the angle times the force of the chain. Thus, in this case, 37% of the force. This does not imply that 37% of the force is lost, to the contrary, this stiffening of the suspension reduces pedal-induced bobbing and maintains efficiencies while still allowing some suspension movement as necessary on bigger hits.

At full compression of the suspension with the rear triangle as shown in 16', the angle slightly decreases to 61 degrees (first compressed pull angle 118). Thus, the linkage arrangement provides a slightly progressive suspension— the more the suspension compresses, the stiffer it gets. So initial stroke allows the suspension to move over small bumps and hits, but as the stroke continues the pedaling effect on stiffening the suspension increases. Of course the angle of the cylinder 46 and slider 88 can be revised to provide more aggressive stiffening or lighter stiffening with suspension compression. In the case shown here, the effect is quite favorable compared to the prior art designs. The generally transverse orientation of the slide link (slider 88) relative to the chain pull, creates a system that is not much affected by pedal forces. The control arm link also comes into play in keeping the suspension from moving due to pedal/chain forces. That effect will be discussed further below in connection with FIG. 8A.

Moving to FIG. 5B, with the chain engaging the middle chain ring 120 on the front and an intermediate rear sprocket 122 at the rear, the angles are greater relative to the arrangement from FIG. 5A. Thus, in the situation where the rider is riding varied terrain—not a steep climb or a big descent— the suspension is only slightly stiffened by chain pull. The stiffening again increases (i.e., slightly progressive) with the compression of towards the state of 16' of the rear triangle. Thus, the suspension is active and useful in this gear range. The angles extend from 75 degrees (second uncompressed pull angle 124) to 68 degrees (second compressed pull angle 126).

In FIG. 5C, the large chain ring 128 is engaged on the front and the small rear sprocket is engaged on the rear. This provides the least leverage for the rider, but the most speed (assuming not too much resistance). This is downhill or at least flat-and-fast arrangement. Thus, the suspension is most fully active. With a third uncompressed pull angle of 78 degrees (132) and the line of chain pull 78 extending at or slightly over the forward and rearward pivot links 100, 102, the suspension can soak up the bumps mostly neutrally— without pedaling significantly affecting the suspension action. Even in the third, fully compressed pull angle 134, the angle is a large 71 degrees.

The chain-line forces and the interaction with the control arm link are shown in FIG. 7. The rearward link pivot 102 is alternatively on the sides of the lower cylinder 46.

However, this assessment applies as well to the arrangement specifically shown in FIGS. 5A-C above. Depending on the front and rear gears selected, the force vector of the chain proceeds through or above or below the rearward pivot 102. The orientation of the pivot in a compressed suspension state or an uncompressed state also affect the reaction the overall suspension system has to the chain forces. For example, while the angles discussed above with regard to the angle of the slider 88 relative to the chain pull may create a somewhat progressive suspension arrangement stiffening with increased suspension travel, the chain tension vectors geometry relative to the front and rear link pivots 100, 102 may accentuate or diminish the effects due to the angle of the slider 88.

As seen in FIG. 7, the a middle/middle tension vector 146 is created with the chain following the middle chain ring on the front and an intermediate sprocket on the rear cogset. In the uncompressed arrangement, this vector intersects the rearward link pivot 102 as well as the forward link pivot 100, creating a neutral situation vis-à-vis the link 48. Or this will be nearly neutral as the alignment with rider sag and other factors may not align the pivots exactly. Design concerns may also dictate a desirability of not exactly aligning the vector with the pivots. This is discussed simply as one embodiment for consideration.

At the uncompressed state of the rear triangle 16, a small/large tension vector 148 is created with the chain on the small chain ring in the front and on a large sprocket on the rear cogset. In this situation, the tension vector 148 extends below the pivots 100, 102 to slightly stiffen the suspension with chain loading (i.e., pedaling). Conversely, in a large chain ring—small sprocket situation for fast riding (such as downhill), the large/small tension vector 150 is created extending above the pivots 100, 102. Thus, by configuring the geometries accordingly, plush suspension travel can be maintained for fast, bumpy descents.

In the compressed state of rear triangle 16', the vectors have the same orientation with regard to the rearward link pivot 102', but have a different position relative to the forward link pivot 100. The geometries may be configured to soften the suspension slightly for a more regressive setup. They may also be configured to counter a more progressive setup of the angle of the slider. Note that the vectors 146', 148', and 150' project above the forward link pivot location 100. This arrangement would tend to soften the suspension, (other factors being held constant), tending toward a regressive arrangement as the force vectors slightly push the link 48' upwardly and rearwardly relative to the forward pivot 100. Such a regressive arrangement may be desirable to absorb big terrain hits, while providing an initially stiffer suspension that is not as affected by pedaling forces and rider bobbing.

Figure 8A:
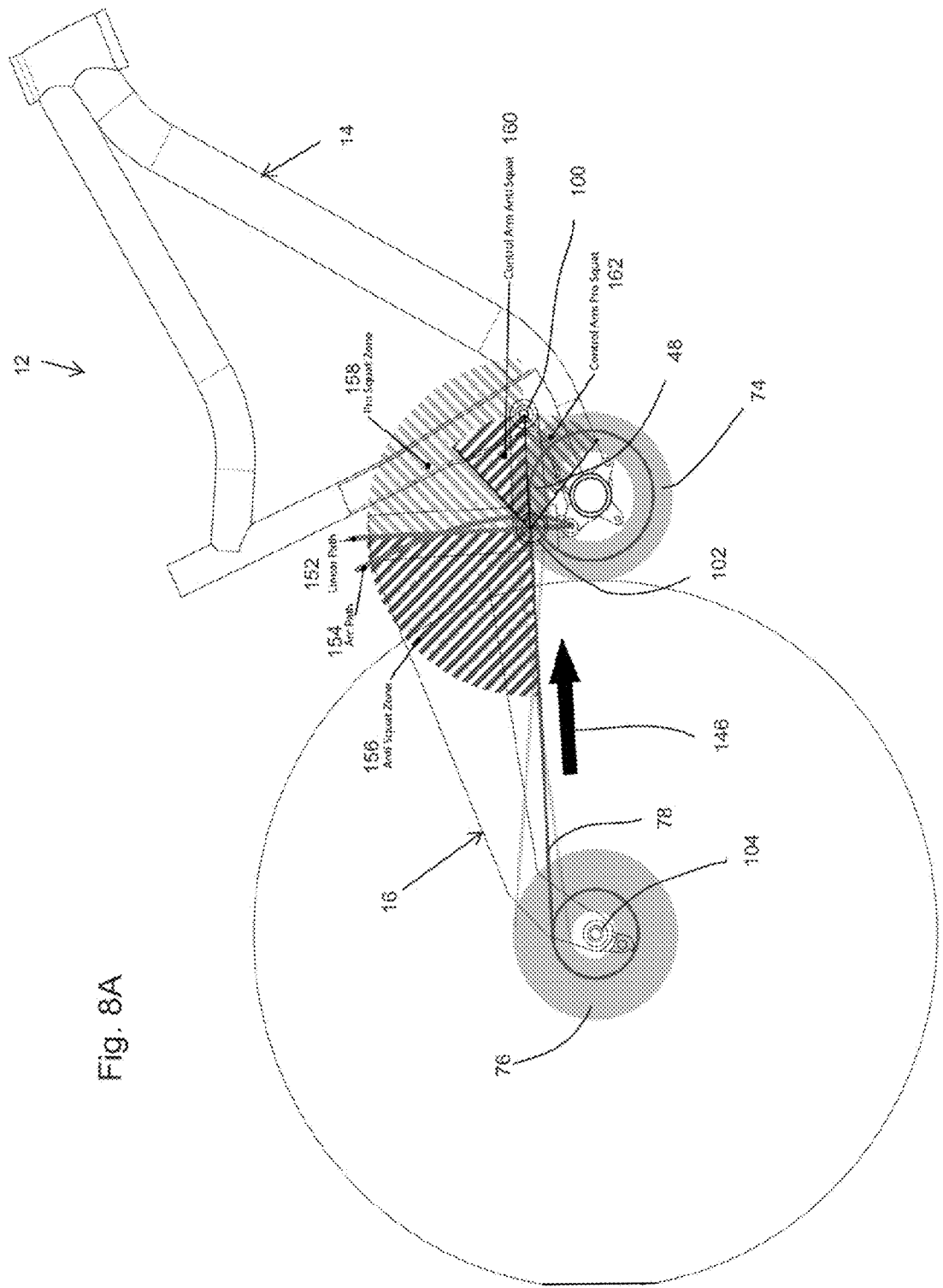
FIG. 8A illustrates the effect of slider orientation and control arm link orientation on vehicle squat.

Thus, the angles of the slider 88 and the control arm link 48 interplay with one another and with the front and rear triangles 14, 16 to provide distinct suspension characteristics. FIG. 8A helps define the parameters. With regard to the angle of the slider 88, depending on the gear combination selection (large, intermediate, or small front chain ring combined with large, intermediate, or small rear sprocket) an anti-squat 156 or pro-squat 158 configuration can be had. Generally, angling the slider 88 back towards the rear creates a more anti-squat configuration since the chain forces tend to hold the cylinder 46 down on the slider 88 due to chain tension. Angling the slider 88 forward creates a more pro-squat configuration since the chain forces then tend to pull the slider 88 from the cylinder 46.

The path of slider 88 need not be linear as shown at 152. The slider can follow an arcuate path, such as at 154 in FIG. 8A. The path can be created to provide desired suspension characteristics. The slider itself can have a curve to it with a follower to create the arc path 154. Alternatively, the linkage (such as link 48) in combination with a straight slider can create a curved final path.

The anti-squat 160 and pro-squat 162 zones for the control arm link are also shown in FIG. 8A. The control arm zones are shown independent of the slider zones. The interplay between the combination of zones can be used to create desired suspension characteristics. The control arm anti-squat zone 160 is created by moving the forward link pivot 100 above the chain tension vector 146 (assuming the rearward link pivot 102 is lower relative to the vector 146. The control arm pro-squat zone 162 is created by moving the forward link pivot down in its mounting location.

Figure 8B:
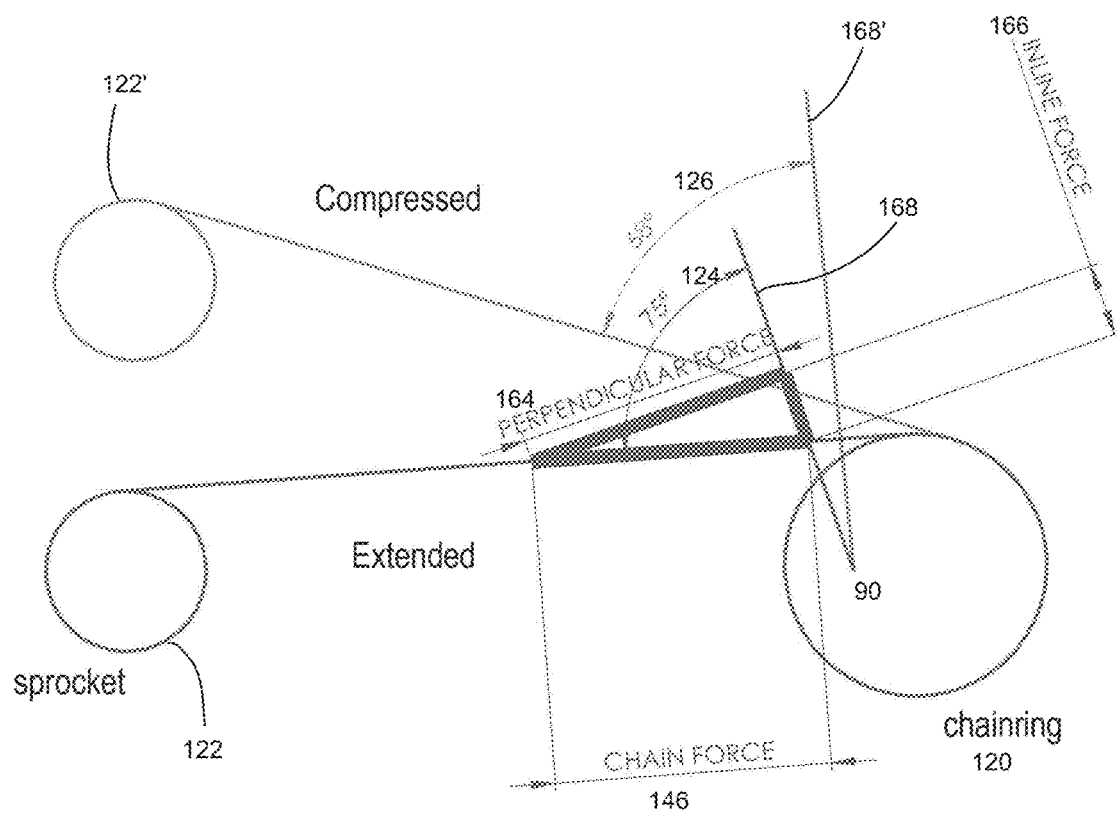
FIG. 8B resolves chain forces relative to the slider under compressed and extended suspension states.

FIG. 8B depicts the resolution of forces with regard to the slider 88 and the chain tension vector. As discussed above, the angles change depending on the front/rear gearing combination and on the amount of suspension compression of the rear triangle relative to the front triangle. The resultant inline force is the amount the slider is pushed into or pulled out of the cylinder to stiffen or soften the suspension. Of course, this is independent of other links and forces. The angle of the slider in the uncompressed and compressed states is shown at 168, 168'. The angles are shown at 124, 126. The chain force is shown at 146 with the perpendicular force of 164 and inline force of 166.

Figure 8C:
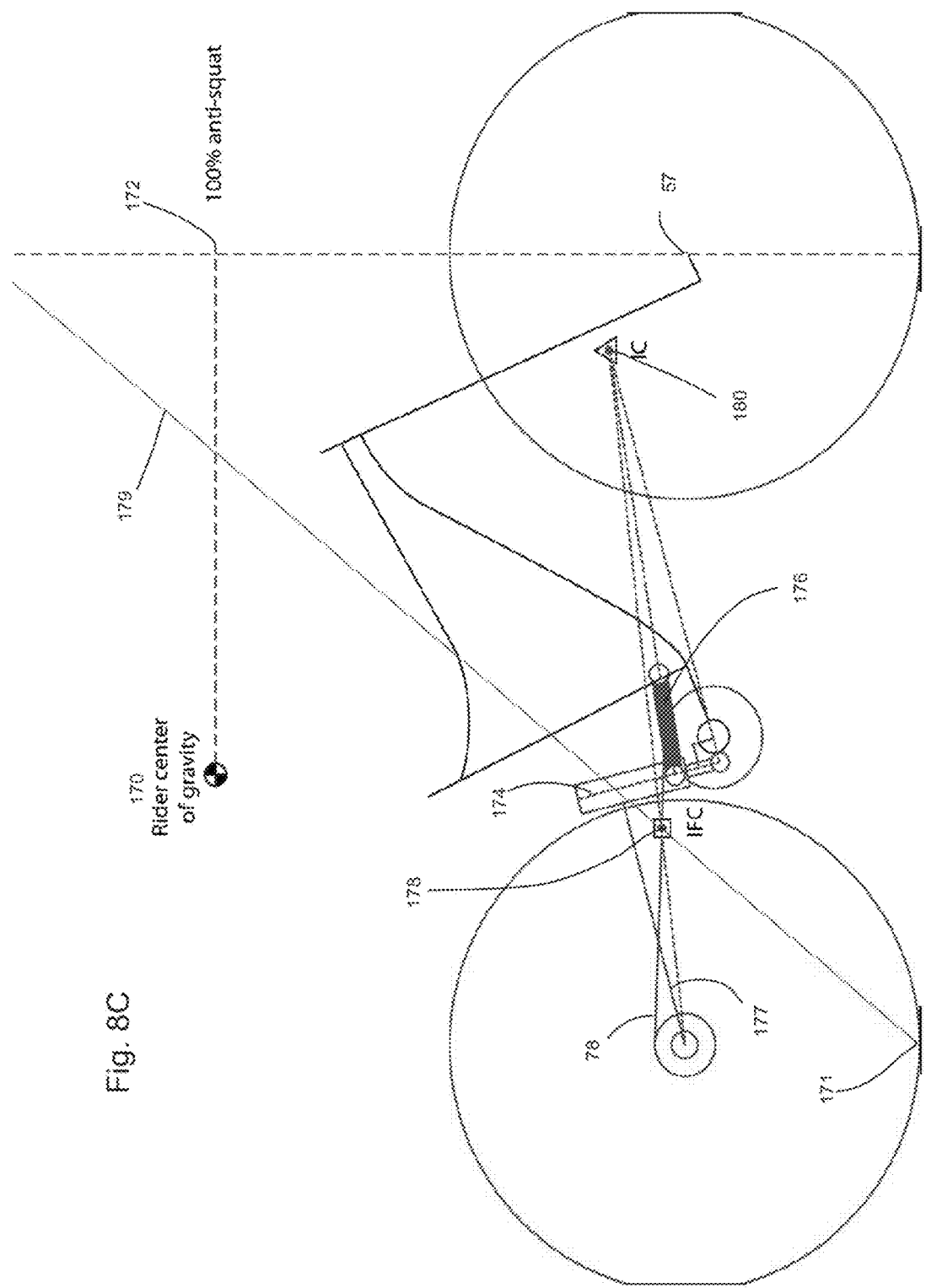
FIG. 8C diagrams vehicle squat conditions at rider sag of the suspension of the present invention.

FIG. 8C addresses the anti-squat issues based on the rear suspension at about 25% rider sag. The rider center of gravity 170 is above the bicycle. A line horizontal from the cg 170 intersects the vertical line from the front axle 57 (or tire contact with the ground) at 172 (i.e., the full neutral anti-squat position—100% anti-squat). The longitudinal axle of the cylinder and slider is at 174. The control arm link is shown at 176. A perpendicular line from the axis of the slider to the rear axle is shown at 177. The intersection of the chain line with a line to the instant center of rotation is shown at 178. The intersection of this line with the axis of the control arm link 176 is shown at 180. Note that 178 represents the instant force center of the rear suspension under pedaling. The instant center of rotation with this rear suspension under braking is shown at 180. Line 179 helps determine tendency of the bicycle to squat under a pedal load. Line 179 extends from the rear-tire ground contact patch 171 through the instant force center 178. As this line 179 intersects the line between the rider center of gravity 170 and point 172, the pedaling forces result in rear anti-squat. If the line 179 were forward of point 172, pedaling forces would tend to induce squatting of the rear suspension.

Note relating to both pedaling and braking the configuration of the suspension of the bicycle can be changed to affect the location of the instant center of rotation and the instant force center. Changing these locations changes the squat characteristics of the suspension. For example, if the axis 174 of the slider is rotated the suspension may be pro-squat or anti-squat. The linear slide angle can be adjusted along with the link angle to finely tune the suspension over the full stroke of the suspension travel.

Figure 9A:
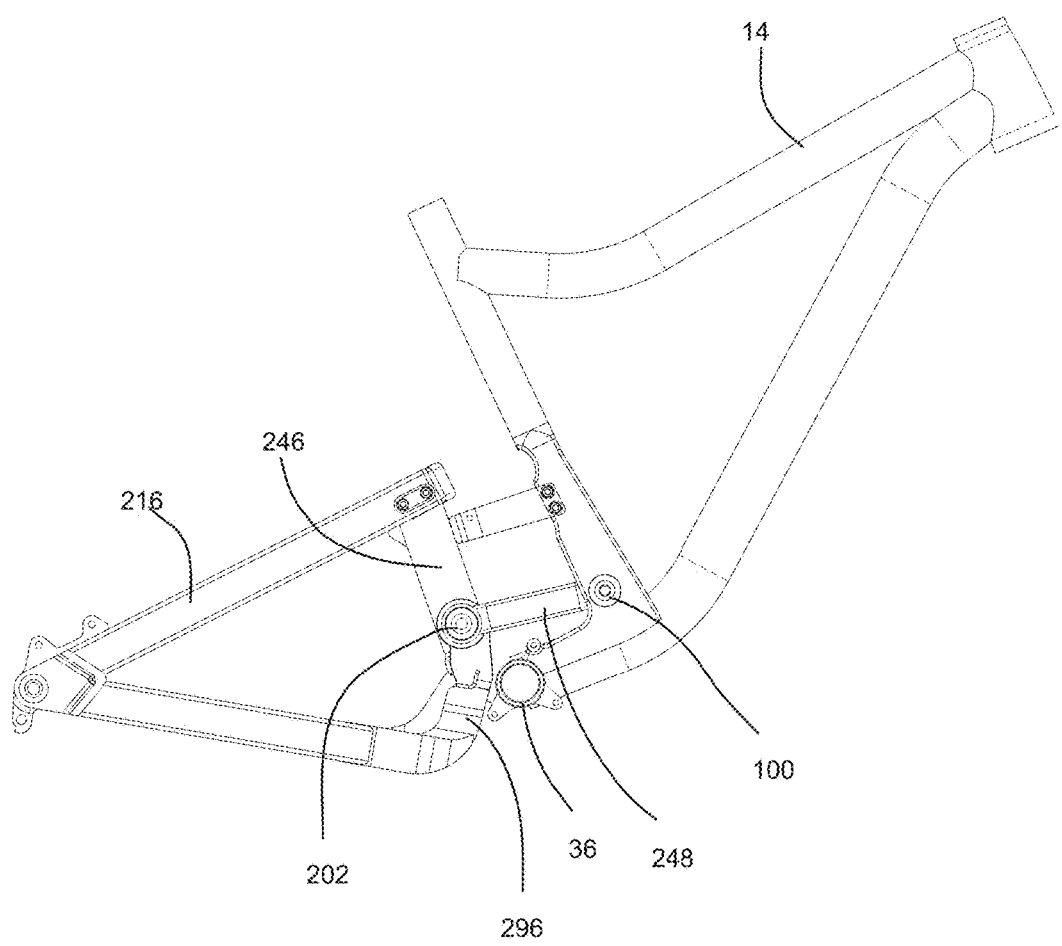
FIG. 9A is a side-elevational view of an alternate embodiment of the rear suspension having a control arm link pivot on the side of the slider.

Other linkage dimensions and configurations are also possible based on the same concepts discussed above. FIG. 9A shows a configuration with the control arm link 247 extending rearwardly to the intersect with the lower portion of the cylinder 246. In this embodiment, the front triangle 14 is essentially the same as previous embodiments. However, the control arm link 248 is longer and extends to a mount location to one or both sides of the cylinder 246. This changes the configuration of the chain stay arms 196 as well, as they do not have to project forward of the cylinder.

FIG. 9B shows various mounting possibilities of the control arm link 248, 248', and 248". Consistent with different fore/aft and vertical mounting locations of the link 248, the slider BB mount 290, 290', 290" location can be varied to vary the characteristics of the suspension. For example, by placing the mounting location of the BB mount at 290' the slider angle shift back from 268 to 268'. Further repositioning of the BB mount at 290" further increases the rearward angle of the slider 268". Such mount locations may be desirable, for example, to stiffen the suspension when in small chain ring for climbing, as discussed above.

Figure 10A:
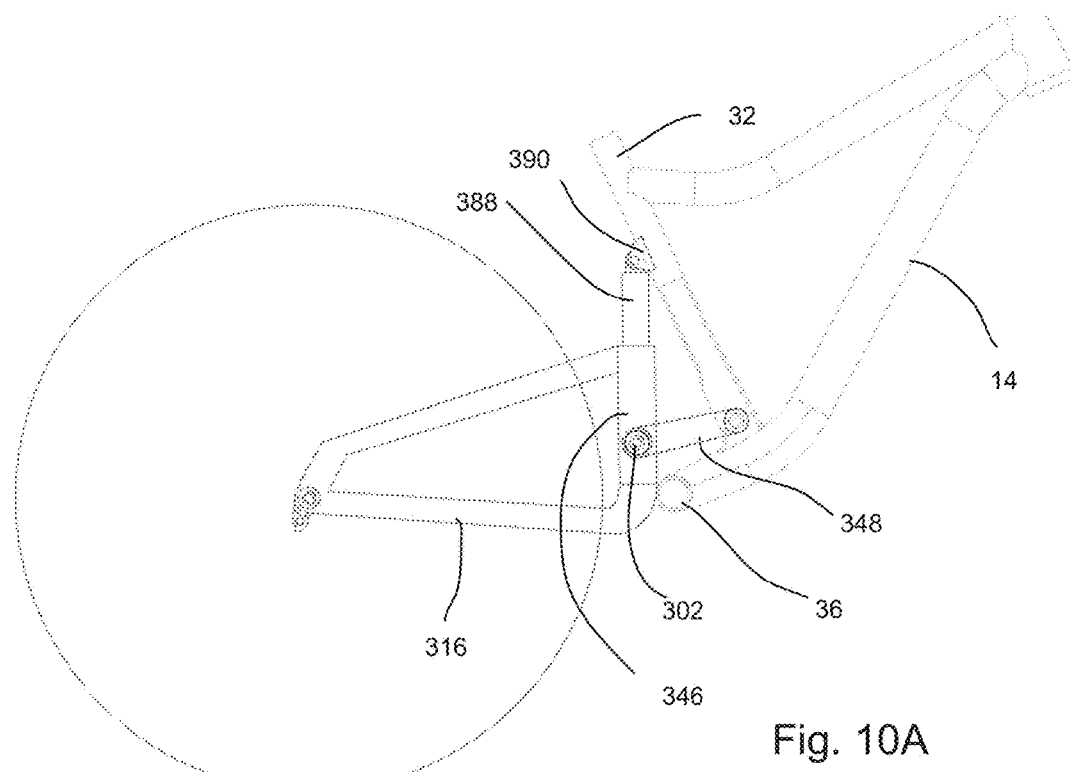
FIG. 10A is a side-elevational view of an alternate rear linkage configuration of the present invention.

FIG. 10A illustrates another change to the configuration that still falls within the concepts discussed herein. In this embodiment, the cylinder 346 and slider 388 are reversed such that the slider 388 exits the top of the cylinder 346 instead of the bottom. The slider 388 is pivotally secured to a slider mount bracket 390 on a upper portion of the seat tube 32. Instead of a pull shock the slider and cylinder assembly function as a compression shock with the slider entering further within the cylinder upon compression of the suspension. The control arm link 348 still completes the linkage to help control the movement of the rear triangle 316 relative to the front triangle 14.

FIG. 10B shows an embodiment similar to that of FIG. 10A. However, in this embodiment, a constrained second link 390a is pivotally secured to the seat tube 32. The other end of the second link 390a is constrained by member 349. The slider 388 is pivotally attached between the two end connections (to the member 349 and to the seat tube 32. Member 349 extends from its connection with second link 390a and a connection to an intermediate portion of control arm link 348. Member 349 is preferably adjustable in length in order to generate various wheel path trajectories.

Figure 11:
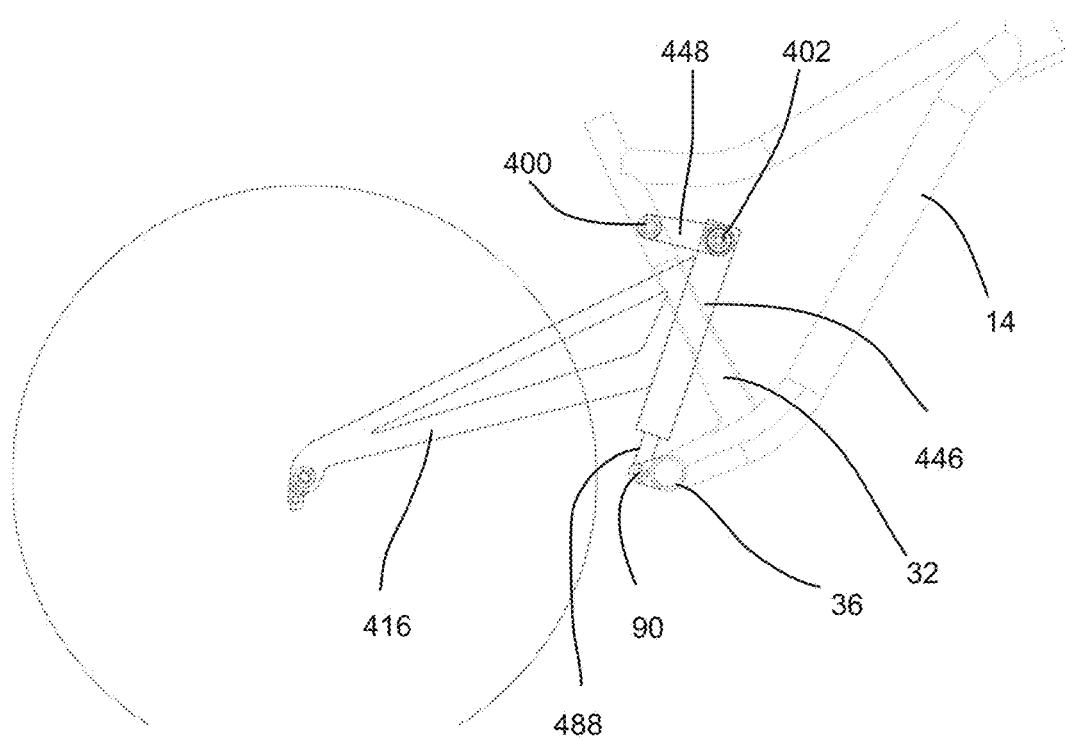
FIG. 11 is a side-elevational view of an alternate rear linkage configuration of the present invention.

FIG. 11 presents still another alternate embodiment. The bottom end of slider 488 is still secured to BB mount 90, however, the control arm link 448 is pivotally secured to the upper end of cylinder 446, between cylinder 446 and seat tube 32. A cylinder pivot 402 secures one end of the link 448 to the cylinder, while a seat tube pivot 400 secures the other end to the seat tube 32. As is evident in the figure, the angle of the slider 488 is tilted much more forward in this embodiment. Such an arrangement may have characteristics advantageous for certain types of bicycles and certain types of riding. Pedaling forces may tend to soften the suspension in this configuration.

An additional feature that may be added to several of the embodiments herein is illustrated in FIGS. 12A-D. The outer end of the slider 588 or either end of the control arm link 548 may include a mount cam 591 securing the pivot. Thus, with regard to placing the cam on the slider BB mount 590, the cam provides extended travel for the rear triangle 516. The cam rotates about a transverse axis and is controlled by a cam clutch 593. The clutch 593 includes a clutch cable 595 extending therefrom that engages the cam 591. The clutch includes a clasp mechanism that secures the cable 595 under a predetermined acceleration, velocity, or position of the cable relative to the clutch (or of the acceleration, velocity, or position of the rear triangle relative to the front triangle). For example, a centrifugal clutch mechanism is responsive to acceleration and velocity to engage. Pawls or other mechanisms, even electronically controlled mechanisms may be used. Position sensitive switches may also be used to close the clasp mechanism on the cable to engage the clutch.

Upon engagement, the clutch 593 pulls the cable 595 to turn the cam 591 such that the pivot 590 is moved from its first, lower position to an upper position 590" that provides more suspension travel of the rear triangle 516. So in FIG. 12A the movement of the rear triangle without the clutch engagement is shown at 516', while the full movement possible with the clutch turning the cam to a higher pivot location is shown at 516". With this cam system, a bicycle rear suspension can function well as a moderate suspension travel bicycle or as a large-travel suspension bicycle automatically when a big hit that introduces large acceleration, velocity, or displacement of the rear suspension. Thus, the advantages of a moderate travel suspension are realized while providing for big-hit capabilities.

FIG. 12B is a simplified schematic illustration of the cam system for comparison with placing the cam at the control link cylinder pivot location (FIG. 12C) or at the seat stay pivot location (FIG. 12D). As the link travels upwardly, the extended travel advantages are realized in these cam locations as well by essentially extending the link as needed based on the factors discussed above.

Figure 13A:
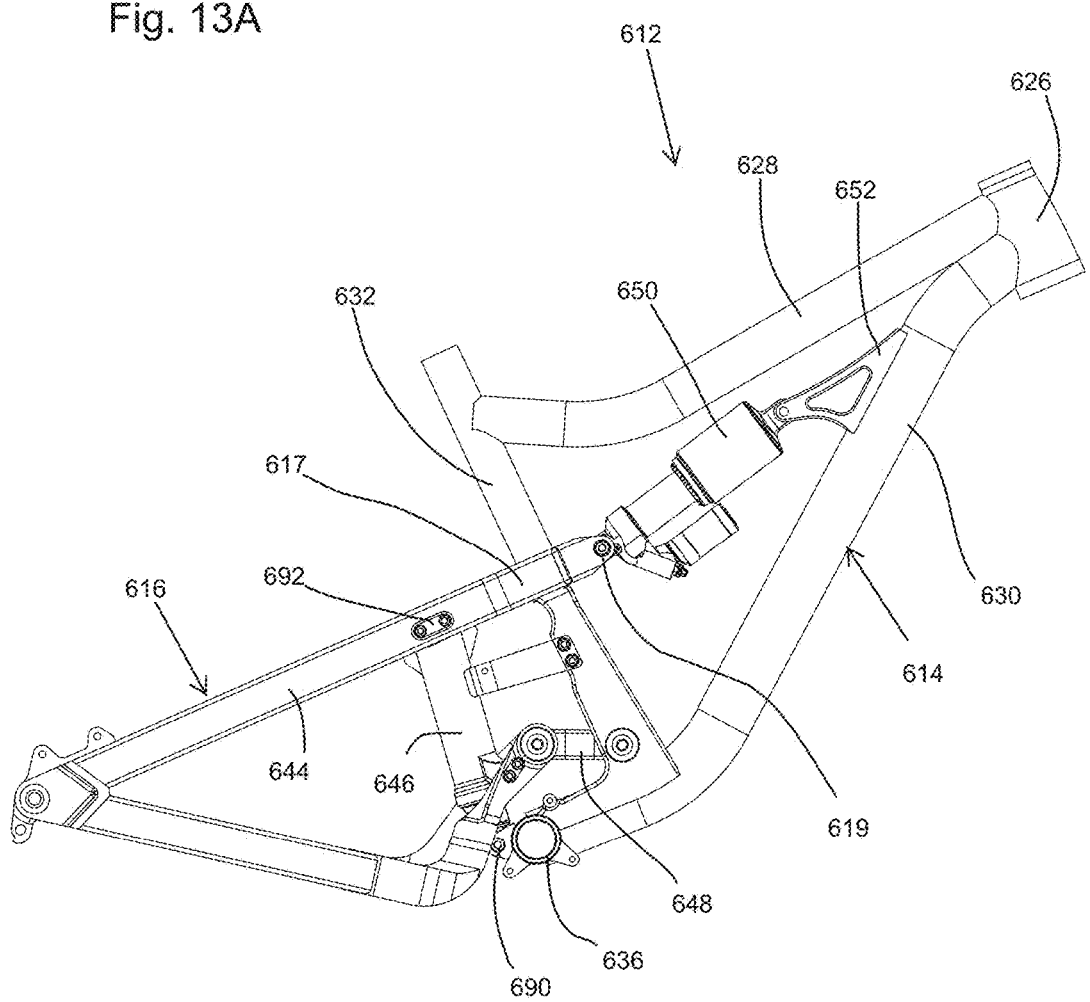
FIG. 13A is a side-elevational view of an embodiment of the present invention with an external spring and shock absorber unit.

FIGS. 13A and B illustrate the alternate embodiment that is used on the bicycle of FIG. 1. Instead of relying on the slider and cylinder 646 to provide the damping and spring forces, a separate shock 650 that includes a damper and spring is secured to the forward end of the chain stays 644. Shock mount arms 617 extend forward from the junction of the chain stays 644 with the top of cylinder 646. Arms 617 extend around one or both sides of seat tube 632 to a shock rear mount 619. Mount 619 is secured to the rear of shock 650, while the front of shock 650 is pivotally secured to shock front bracket 652, secured to a forward portion of down tube 630. Alternately the forward end of shock 650 could be secured to any portion of the front triangle 614, the top tube or even the seat tube with a pull shock or other arrangement.

As discussed above, the angle of the shock 650 can be modified by mounting to attain progressive, regressive, or neutral shock characteristics. Most air springs are quite progressive in nature such that a regressive mounting arrangement may reduce the severity of the progressive spring. Alternatively, a coil spring is typically linear in rate while a progressive rate may be desired and achieved with the mounting location interacting with the movement of the forward end of the mount arms based on the configuration of the four-bar linkage.

Figure 13B:
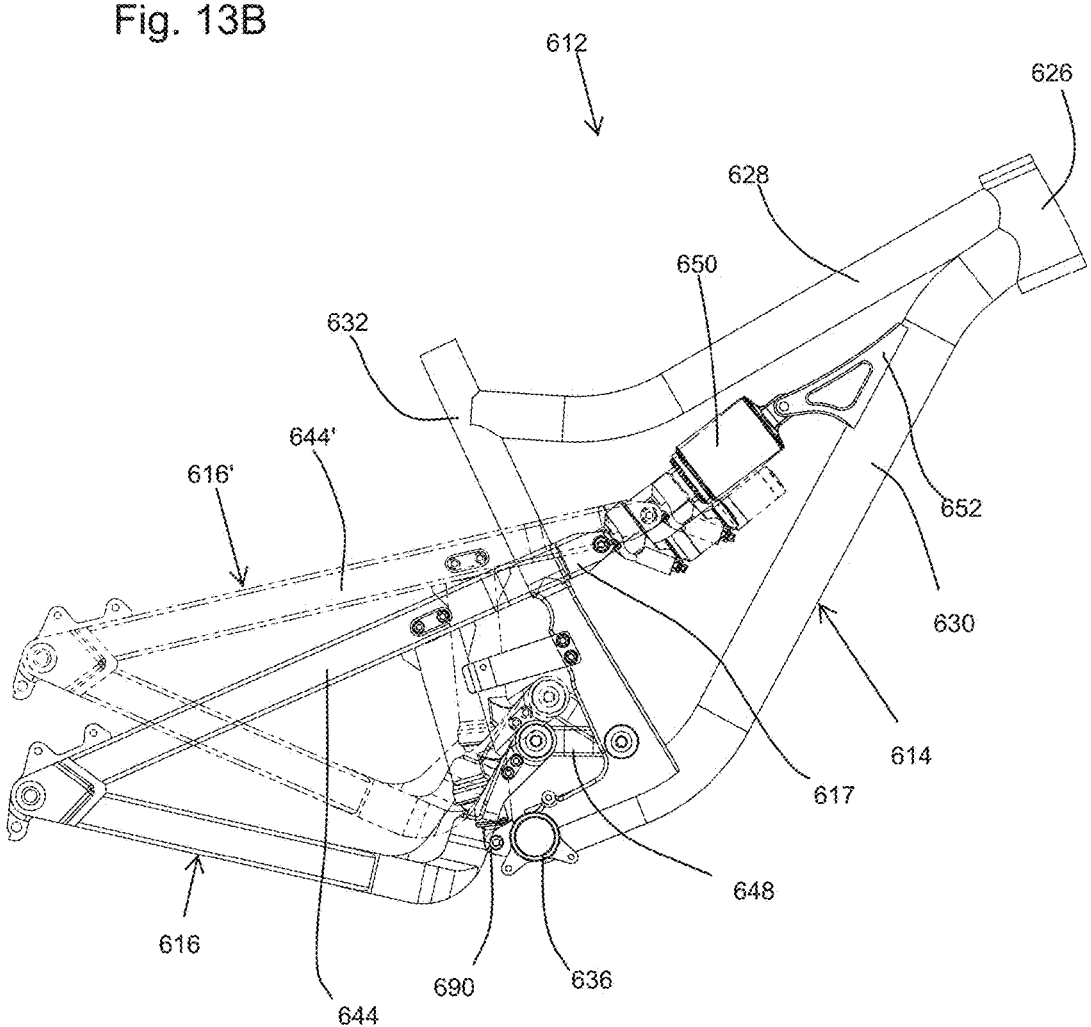
FIG. 13B is a view of the embodiment of FIG. 13A showing range of movement of the rear triangle.

FIG. 13B illustrates the movement of the rear triangle 616 to 616'. Note that the compression of the shock 650 is generally along its axis in this particular preferred mounting arrangement.

Figure 14A:
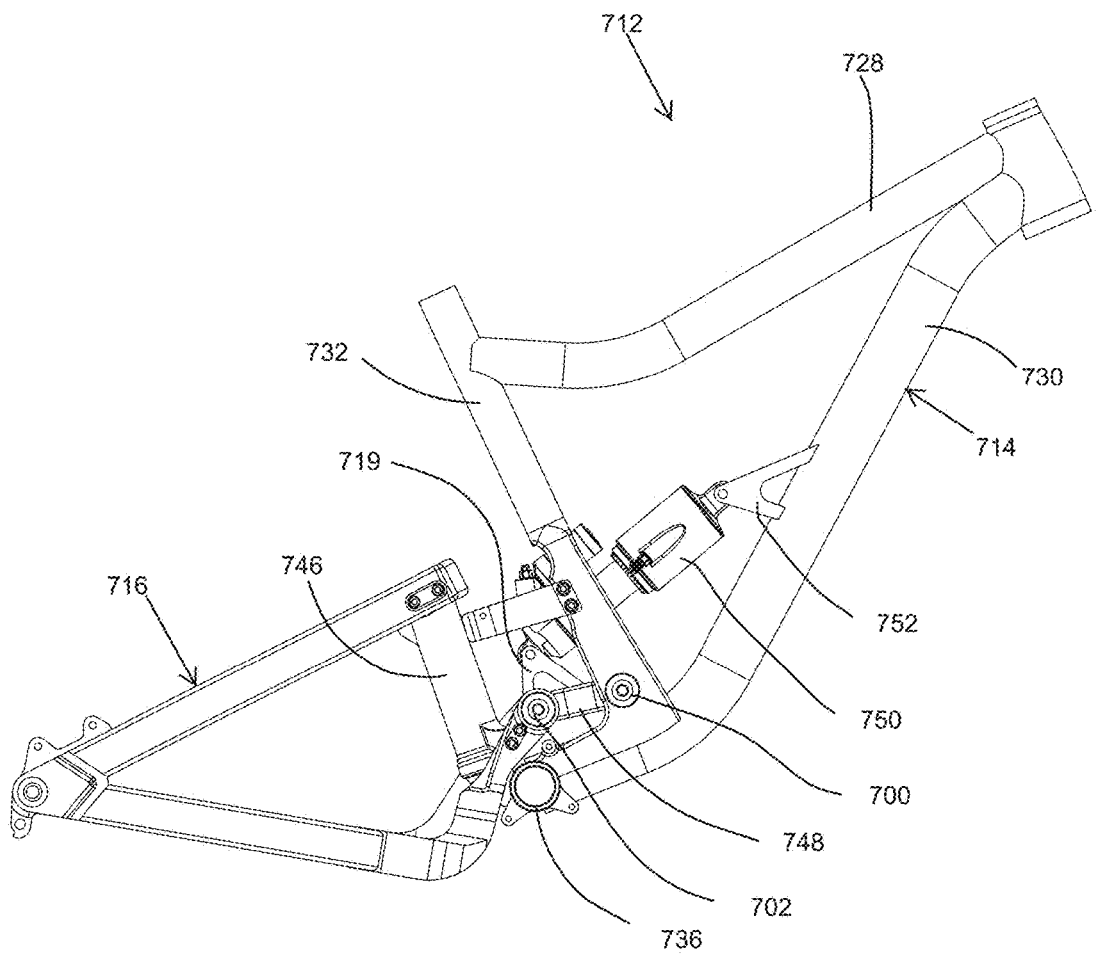
FIG. 14A is a side-elevational view of another embodiment of the present invention with an external spring and shock absorber unit.

Another embodiment, also with a shock external to the cylinder, is shown in FIGS. 14A and B. In this embodiment the shock 750 is mounted 719 to the control arm link 748 between the rearward pivot 702 and the forward pivot 700. The shock body itself extends through the lower portion of the seat tube 732 above the forward pivot 700. Again, geometries can be arranged to achieve desired suspension characteristics. This arrangement has the advantages of being compact and having a low center of gravity.

The hydro-pneumatic shock assembly 813 of FIG. 15 can be used on any of the linkage geometries discussed herein. The assembly 813 includes a shock assembly 815 housed anywhere on the bike—preferably in the down tube 830 and a slave cylinder 817 providing the spring force and damping within the shock assembly secured to the rear triangle 816. Preferably the slave cylinder is within the pull shock arrangement housed by cylinder 846. However, the slave cylinder can be in any location to control spring and damping movement between the front and rear triangles, just as the external shocks discussed above are in various locations.

The shock assembly 815 includes send and receive fluid lines 823 and 821 for compression and rebound movement of fluids from the shock assembly 815 to the slave cylinder 817. Compression and rebound controls 823, 825 are in fluid communication with the send and receive (compression and rebound) fluid lines 823, 821. The shock assembly 815 preferably includes hydraulic fluid as well as a gas chamber (such as for nitrogen gas). The two areas are separated by a member such as a piston or bladder or both. The gas pressure in the shock assembly provides the spring force to feed to the slave cylinder through the hydraulic fluid, while the passage of the fluid through the controls provides damping. The controls 823, 825 can be mechanical or electro-mechanical.

A air cooling system is also provided with ambient air entering an air intake port 827 proximate the head tube 826. The air is channeled through the down tube 830 to cool the fluid in the shock assembly 815. The air exits at an air exit port at the lower end of the down tube 830. An air filter 831 may be provided at the air intake port. Cooling fins may extend from the shock assembly to speed heat transfer.

Figure 16A:
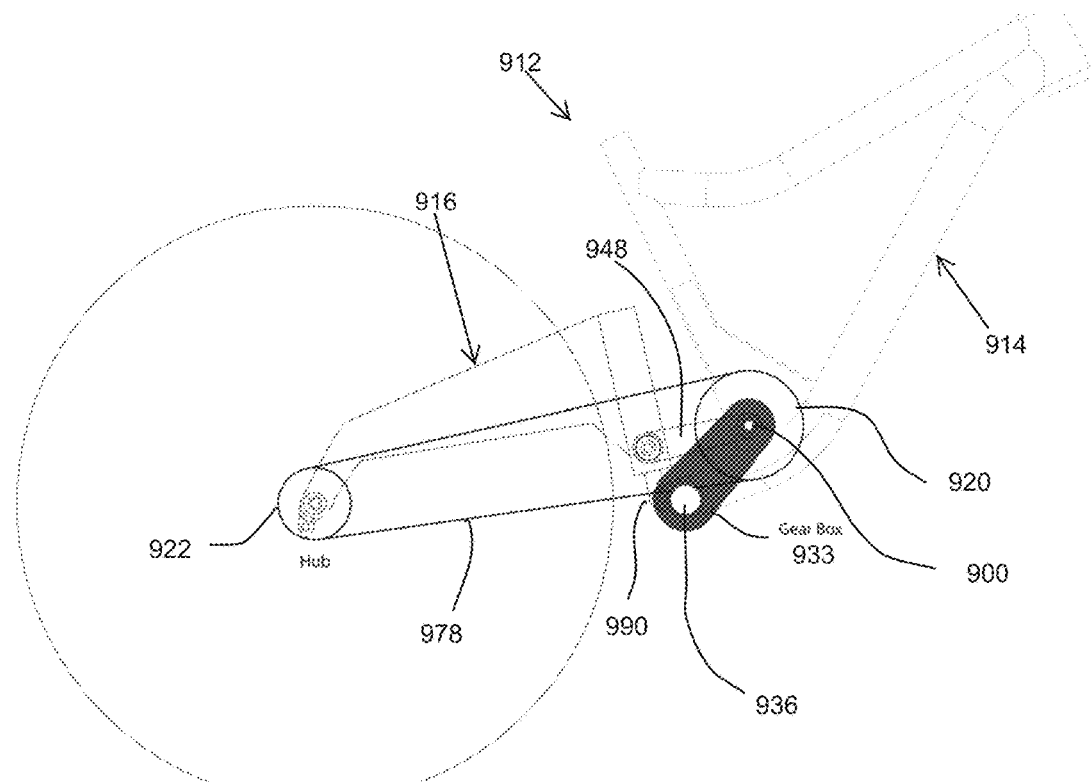
FIG. 16A illustrates the use of a gearbox transmission between the bottom bracket and the front pivot of the control arm link.
Figure 16B:
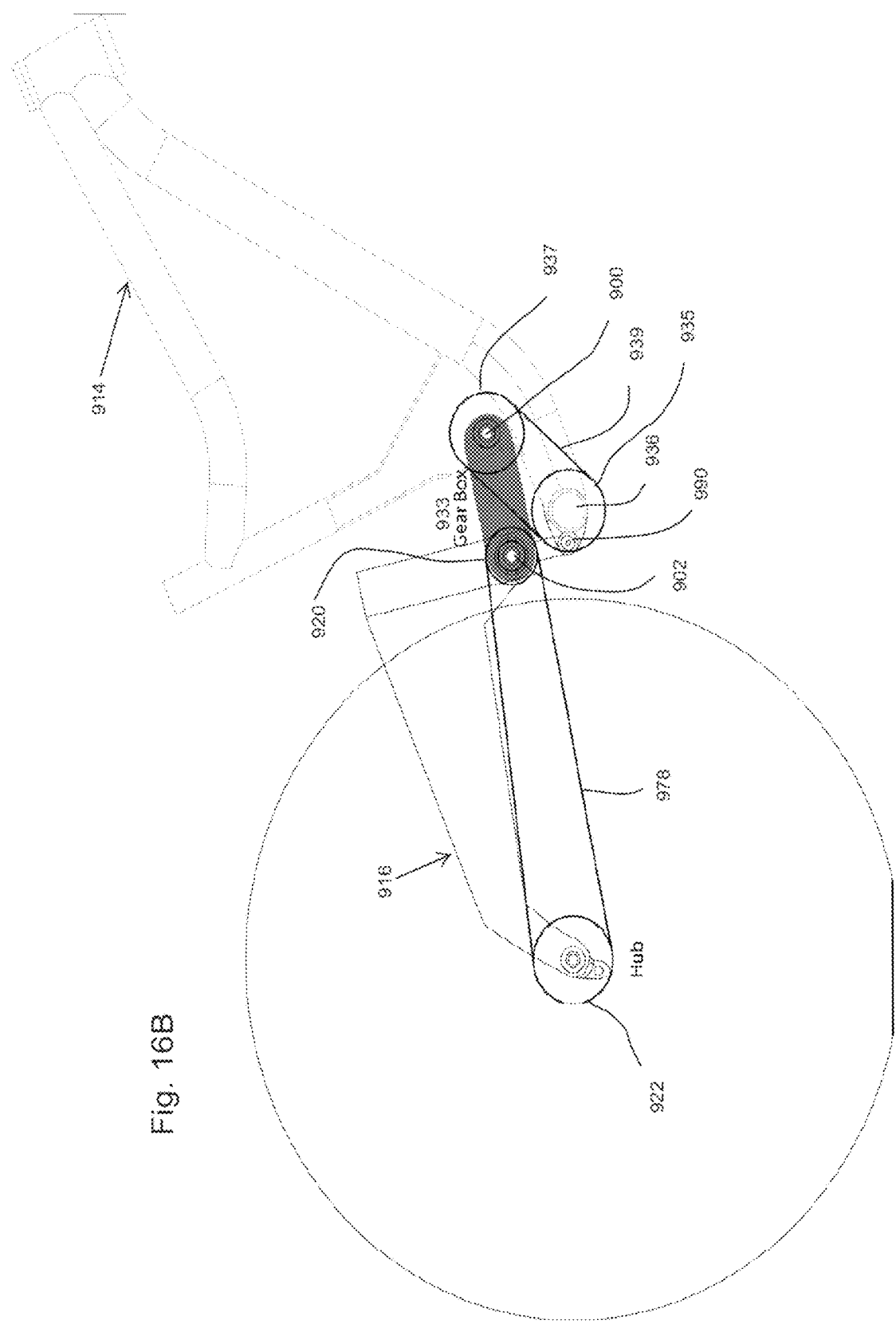
FIG. 16B illustrates the use of a gearbox transmission along or in place of the control arm link.

The embodiments of the present invention may also benefit from the addition of a gearbox 933 as shown in either of FIG. 16A or 16B. In FIG. 16A the gearbox 933 extends between the bottom bracket 936 to the forward pivot 900 of the control link. A driveline 978 extends between a front sprocket 920 and a rear sprocket 922. The gearbox may be as shown and described in U.S. Patent Publication No. 2006/0063624, published on Mar. 23, 2006, the contents of which are hereby incorporated by reference.

The gearbox 933 may alternatively extend from the forward pivot 900 to the rearward pivot 902 either along or in place of the control arm link. In this embodiment, a drive sprocket 935 is driven from the bottom bracket 936 to a driven sprocket 937 with a drive belt 939. The gearbox 933 then transfers the power to the front sprocket 920 and through a chain 978 or some other drive line to the rear through another sprocket 922 or the like secured to the rear hub. The suspension linkage arrangements discussed herein can be applied as the example shown in the figure.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A suspension for a vehicle for traveling over a ground on a ground-engaging member, the vehicle having a frame member to be suspended relative to the ground, the suspension comprising:
    an arm having a first end and a second end, the arm extending between the frame member generally at the first end and the ground-engaging member generally at the second end; and
    a slide link coupled to the frame member and to the arm, the slide link, oriented in an anti-squat configuration, comprising a part of a four-bar suspension between the arm and the frame member.

2. The suspension of claim 1, wherein the ground-engaging member follows a suspension travel path and wherein the slide link includes a slider that follows a path oriented within about 30 degrees of parallel to the suspension travel path.

3. The suspension of claim 2, wherein the slider follows a linear path relative to the arm.

4. The suspension of claim 1, wherein the slide link includes a cylinder mated with a slider.

5. The suspension of claim 4, wherein the slide link includes a spring with the cylinder.

6. The suspension of claim 5, wherein the slide link is a pull shock.

7. The suspension of claim 5, wherein the slide link is a compression shock.

8. The suspension of claim 5, wherein the cylinder houses a damping fluid.

9. The suspension of claim 5, wherein the spring is pneumatic.

10. The suspension of claim 4, wherein the slider follows an arcuate path relative to the arm.

11. The suspension of claim 1, wherein a coupling of the slide link to the frame member is location adjustable.

12. The suspension of claim 11, wherein the coupling of the slide link to the frame member is actively adjustable during riding of the vehicle to extend travel of the arm under predetermined conditions.

13. The suspension of claim 12, wherein the active adjustment occurs at predetermined threshold conditions of at least one of position, velocity, and acceleration of movement of the arm relative to the frame member.

14. The suspension of claim 12, wherein the active adjustment occurs at predetermined threshold conditions of at least one of position, velocity, and acceleration of the movement of a coupling point of the frame member to the slide link relative to a coupling point of the slide link to the arm.

15. The suspension of claim 12, further comprising a cam rotationally mounted to the frame member, the slide link being pivotally mounted to the cam.

16. The suspension of claim 15, further comprising a clutch secured to the arm, and a drive member extending from the clutch to the cam, the drive member driving the cam when the clutch securely grasps the drive member.

17. The suspension of claim 16, wherein the clutch includes a mechanism to grasp the drive member under predetermined conditions of at least one of position, velocity, and acceleration.

18. The suspension of claim 1, wherein the vehicle is a two-wheel vehicle having a front and a rear wheel, the rear wheel being part of the ground-engaging member and being rotatably coupled to the arm, the arm being a swingarm, the vehicle further comprising a flexible drive member extending from the frame member to a coupling with the rear wheel, the vehicle having an instant center of rotation longitudinally between the front wheel axle and the rear wheel axle.

19. The suspension of claim 18, wherein the instant center of rotation of the rear suspension is longitudinally between the bottom bracket shell of the vehicle and the center of the rear wheel.

20. The suspension of claim 18, wherein the slide link has an axis forming an acute angle with the flexible drive member.

21. The suspension of claim 18, wherein the vehicle has an instant force center located longitudinally rearward of the slide link.

22. The suspension of claim 1, further comprising a control link coupled to the frame member and to the arm.

23. The suspension of claim 22, wherein the control link comprises a rigid member pivotally coupled to the arm and pivotally secured to the frame, wherein at least one of the two pivots are location adjustable.

24. A bicycle comprising:
- a front frame member securing a front wheel and a bottom bracket shell;
- a rear arm rotatably securing a rear wheel having an axle, the rear arm being coupled to the front frame member;
- a drive train coupled between the bottom bracket shell and the rear wheel; and
- a slide link coupled between the front frame member and the rear arm with a forward end of the slide link vertically below a rearward end of the slide link, the slide link comprising a first portion slidingly coupled to a second portion, the first portion fixedly coupled to one of the front frame member and the rear arm.

25. The bicycle of claim 24, wherein the drive train includes a flexible drive member coupled between the bottom bracket shell and the rear axle, and wherein the suspension has an instant center of force under a vehicle load rearward of the bottom bracket and forward of the rear axle.

26. The bicycle of claim 24, wherein the first portion of the slide link is rotationally fixed to the rear arm to rotationally move therewith, and the second portion of the slide link is pivotally secured to the front frame member to rotate relative to the front frame member,
the suspension further comprising a control link coupled to the front frame member and to the rear arm.

27. The bicycle of claim 26, wherein a sliding motion of the slide link follows a path generally within 30 degrees of vertical.

28. The bicycle of claim 26, wherein the path of the second portion of the slide link is linear relative to the rear arm.

29. The bicycle of claim 28, wherein an axis of the slide link maintains an angle between 50 and 90 degrees with a top run of the flexible drive member during the full range of suspension travel and gearing combinations.

30. The bicycle of claim 26, wherein the second portion of the slide link is pivotally connected to the front frame member adjacent the bottom bracket shell.

31. The bicycle of claim 24, further comprising a four-bar linkage coupling the front frame member to the rear arm, the second portion of the slide link comprising one link of the four-bar linkage.

32. A rear suspension for a bicycle for traveling over a ground on a rear wheel, the rear suspension comprising:
- a rear frame portion having an axle connection for a rear axle of the rear wheel of the bicycle;
- a slide link comprising a first element slidingly coupled to a second element, the second element having a first pivot connector at an end opposite from the first element, and the first element of the slide link fixedly coupled to the rear frame portion to extend toward the ground from the rear frame portion when positioned for the travelling over the ground; and
- a second pivot connector for a control link on one of the rear frame portion and the first element of the slide link.

33. The suspension of claim 32, wherein the first element of the slide link comprises a cylinder, the second element of the slide link comprises a slider, and the slider is mated with the cylinder to slide therein.

34. The suspension of claim 33, wherein the cylinder houses a damping fluid.

35. The suspension of claim 33, wherein the slide link includes a spring with the cylinder.

36. The suspension of claim 35, wherein the slide link is a pull shock.

37. The suspension of claim 35, wherein the slide link is a compression shock.

38. The suspension of claim 35, wherein the spring is pneumatic.

39. The suspension of claim 33, the control link comprising:
- a rigid member having a first control pivot connector pivotally coupled to the second pivot connector; and
- a second control pivot connector.

40. The suspension of claim 32, wherein an acute angle is formed between an axis of the slide link and a line between the first pivot connector and the rear axle connection.

41. The suspension of claim 32, wherein the rear frame member comprises a swingarm.

42. The suspension of claim 32, wherein the rear frame member comprises a rear triangle.

* * * * *